(12) United States Patent
Fujimoto et al.

(10) Patent No.: US 7,366,593 B2
(45) Date of Patent: Apr. 29, 2008

(54) METHOD AND SYSTEM FOR MANEUVERING MOVABLE OBJECT

(75) Inventors: Hiroaki Fujimoto, Kobe (JP);
Yukinobu Kohno, Kako-Gun (JP);
Masaaki Higashi, Kobe (JP);
Masanori Hamamatsu, Kobe (JP);
Kenichi Nakashima, Kobe (JP); Yasuo Saito, Suita (JP); Hiroshi Ohnishi, Kobe (JP)

(73) Assignees: Kawasaki Jukogyo Kabushiki Kaisha, Chuo-ku, Kobe (JP); Kabushiki Kaisha Kawasaki Zosen, Chuo-ku, Kobe (JP)

( * ) Notice: Subject to any disclaimer, the term of this patent is extended or adjusted under 35 U.S.C. 154(b) by 491 days.

(21) Appl. No.: 10/442,003

(22) Filed: May 20, 2003

(65) Prior Publication Data

US 2004/0006423 A1    Jan. 8, 2004

(30) Foreign Application Priority Data

May 20, 2002    (JP)    ............................. 2002-144878
May 14, 2003    (JP)    ............................. 2003-136373

(51) Int. Cl.
*G01C 21/28*    (2006.01)

(52) U.S. Cl. ...................... 701/21; 701/210; 701/201; 73/117.4; 74/480

(58) Field of Classification Search ............... 701/210, 701/1, 3, 7, 8, 21, 25, 201; 244/182, 191, 244/76 B; 73/178 R, 179, 170.15, 117.4; 340/994; 440/10, 100, 38; 114/312, 337, 114/144; 74/480 B; *G01C 21/28*
See application file for complete search history.

(56) References Cited

U.S. PATENT DOCUMENTS

| | | | | |
|---|---|---|---|---|
| 4,325,123 A | * | 4/1982 | Graham et al. | ............. 701/110 |
| 4,445,179 A | * | 4/1984 | Michelotti | ................... 701/110 |
| 4,519,335 A | * | 5/1985 | Krautkremer et al. | .. 114/144 R |
| 4,532,887 A | * | 8/1985 | Nagata et al. | ........... 114/144 E |
| 5,457,634 A | | 10/1995 | Chakravarty | |
| 5,491,636 A | * | 2/1996 | Robertson et al. | .......... 701/116 |
| 6,171,055 B1 | * | 1/2001 | Vos et al. | ...................... 416/1 |
| 6,266,610 B1 | | 7/2001 | Schultz et al. | |
| 6,273,771 B1 | * | 8/2001 | Buckley et al. | ............... 440/84 |
| 6,309,266 B1 | * | 10/2001 | Burke | ......................... 440/68 |
| 6,450,112 B1 | * | 9/2002 | Deghuee | ................. 114/144 R |
| 6,496,741 B1 | * | 12/2002 | Whiffen | ....................... 700/28 |
| 6,691,004 B2 | * | 2/2004 | Johnson et al. | ............... 701/14 |
| 2003/0070417 A1 | * | 4/2003 | Plumpe, Jr. | .................. 60/230 |
| 2004/0024528 A1 | * | 2/2004 | Patera et al. | ................ 701/301 |

FOREIGN PATENT DOCUMENTS

| | | |
|---|---|---|
| JP | 07-242199 A1 | 9/1995 |
| JP | 2001-287697 A1 | 10/2001 |

\* cited by examiner

*Primary Examiner*—Tuan C To
(74) *Attorney, Agent, or Firm*—Marshall, Gerstein & Borun LLP

(57) ABSTRACT

A movable object maneuver method wherein a destination point is set; wherein a thrust value is calculated in real time which minimizes or maximizes a performance index associated with one or more state variables and thrust required for a movable object to reach the destination point and which takes into account non-linear conditions inherent to the movable object; and wherein the movable object is moved based on the calculated thrust value.

9 Claims, 26 Drawing Sheets

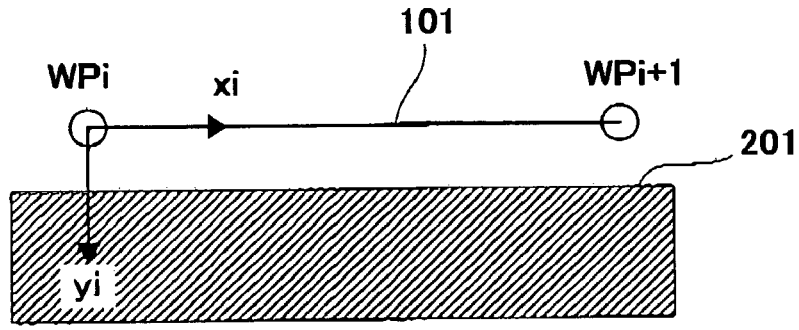
Fig. 6(a)
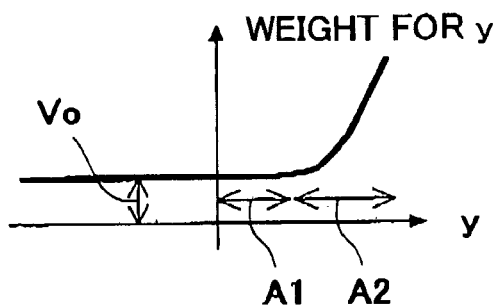
Fig. 6(b)
| CONSTRAINT | DEFINITION |
|---|---|
| "Non" | NO ROUTE CONSTRAINT |
| "Loose" | SMALL ROUTE CONSTRAINT |
| "Middle" | MIDDLE ROUTE CONSTRAINT |
| "Tight" | GREAT ROUTE CONSTRAINT |
| "Strict" | EXCESSIVELY GREAT ROUTE CONSTRAINT (NO CONSTANT WEIGHT REGION) |
Fig. 7

OPTIMUM ROUTE TO THE NEXT DESTINATION
POINT (THE NEXT WP OR THE LIKE) IS CALCULATED
AND SHIP IS CONTROLLED

THE SHIP IS CONTROLLED SUCH THAT DEVIATION
FROM THE TARGET POSITION IS DECREASDE
(e.g., PID CONTROL PERFORMED ON DEVIATION)

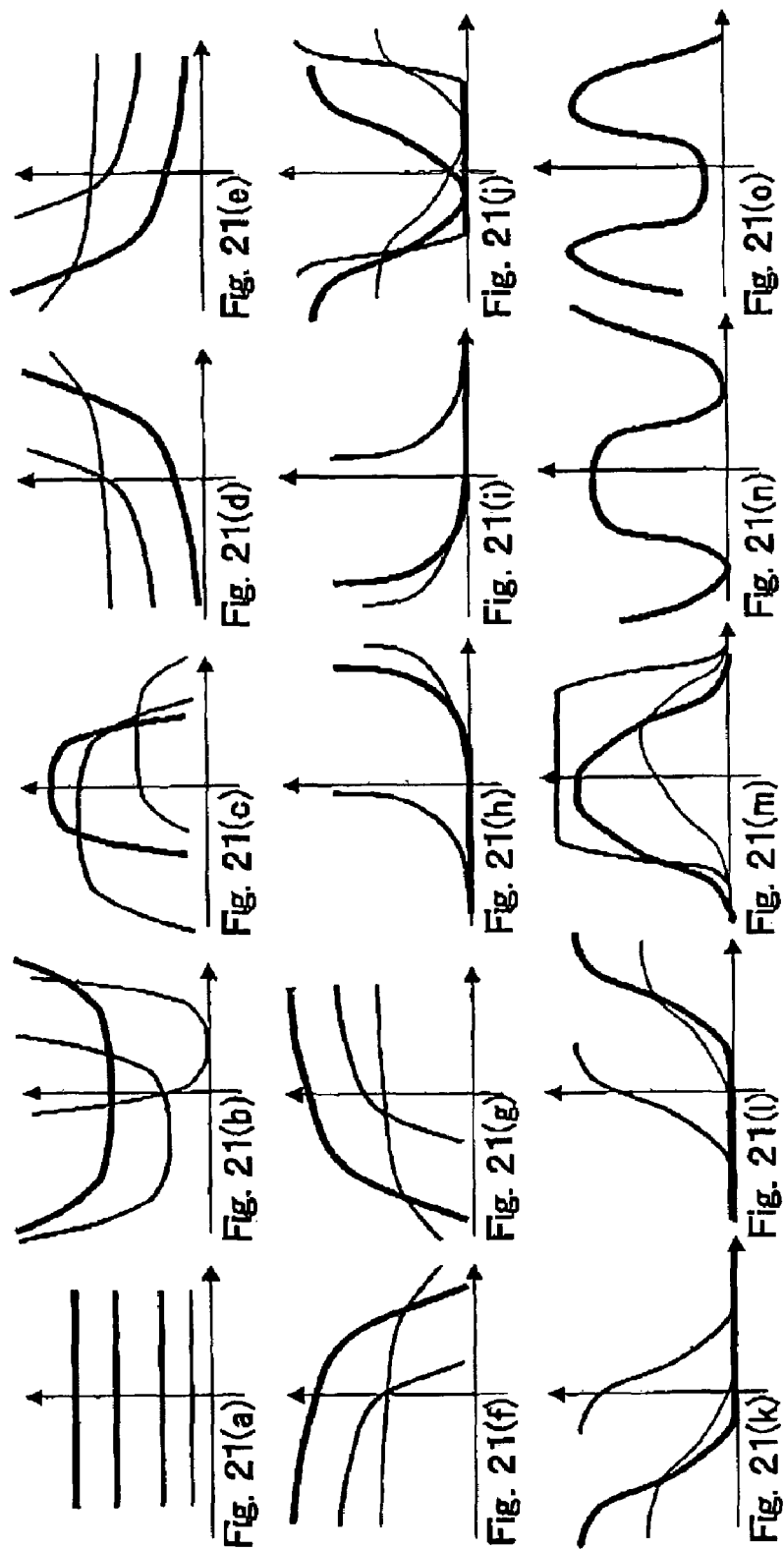

| CODE | COMPONENT | CONTENT |
|---|---|---|
| $[u]$ | $[u\ v\ w]^T$ | SHIP'S ABSOLUTE SPEED (MAIN-BODY FIXED COORDINATE) |
| $[\omega]$ | $[p\ q\ r]^T$ | SHIP'S ANGULAR SPEED (MAIN-BODY FIXED COORDINATE SYSTEM) |
| $[u_f]$ | $[u_f\ v_f\ w_f]^T$ | CURRENT (MAIN-BODY FIXED COORDINATE SYSTEM) |
| $[u_r]$ | $[u_r\ v_r\ w_r]^T$ | SHIP'S LOG SPEED (MAIN-BODY FIXED COORDINATE SYSTEM) |
| $[x]$ | $[x\ y\ z]^T$ | COORDINATES OF ORIGIN OF MAIN-BODY FIXED COORDINATE SYSTEM IN GLOBAL COORDINATE SYSTEM |
| $[\theta]$ | $[\phi\ \theta\ \psi]^T$ | EULER ANGLES INDICATIVE OF SHIP ATTITUDE |
| $[c]$ | SHOWN IN THE SPECIFICATION | DIRECTIONAL COSINE MATRIX OF SHIP ATTITUDE |
| $[F_{BD}]$ | $[X_{BD}\ Y_{BD}\ Z_{BD}\ :\ K_{BD}\ M_{BD}\ N_{BD}]^T$ | FLUID POWER ACTING ON MAIN BODY OF SHIP (NON-POTENTIAL FLOW |
| $[F_{BC}]$ | $[X_{BC}\ Y_{BC}\ Z_{BC}\ :\ K_{BC}\ M_{BC}\ N_{BC}]^T$ | FORCE AND MOMENT CAUSED BY WEIGHT AND BUOYANCY |
| $[F_{WA}]$ | $[X_{WA}\ Y_{WA}\ Z_{WA}\ :\ K_{WA}\ M_{WA}\ N_{WA}]^T$ | FORCE CAUSED BY WING-SHAPED ATTACHMENT (RUDDER) AND WORKING ON MAIN BODY OF SHIP |
| $[F_T]$ | $[X_T\ Y_T\ Z_T\ :\ K_T\ M_T\ N_T]^T$ | FORCE CAUSED BY THRUSTER AND WORKING ON MAIN BODY OF SHIP |
| $[F_p]$ | $[X_p\ Y_p\ Z_p\ :\ K_p\ M_p\ N_p]^T$ | FORCE CAUSED BY MAIN THRUST AND WORKING ON MAIN BODY OF SHIP |

Fig. 27

METHOD AND SYSTEM FOR MANEUVERING MOVABLE OBJECT

BACKGROUND OF THE INVENTION

1. Field of the Invention

The present invention relates to a method and system for maneuvering a movable object and more particularly to a method and system for automatically track-keeping a movable object so as to move along a planned route.

2. Related Background Art

One known example of automatic movable object maneuver methods is a marine track-keeping method. For instance, Japanese Patent Publication Kokai Gazette No. 2001-287697 discloses an track-keeping method. This track-keeping method is carried out in the following way: a destination point is set at a position a specified distance away from the present location on the planned route; course and heading deviations are calculated from the destination point; and thrust that needs to be output from a plurality of propellers (hereinafter, referred to as "actuators") is calculated from the calculated deviations. The route is a continuous planned ship course constituted by a plurality of line segments and a circular arc having a certain radius.

It, however, is necessary for this track-keeping method to momentarily calculate the destination point and to calculate a continuous route from given passing points beforehand. Further, since the ship is controlled so as to decrease the deviations from their respective target values, the ship travels while generating a necessary power so as to decrease the deviations even in disturbances such as winds and currents, involving the ship. This consumes a great amount of power in some cases.

Another known marine track-keeping method is disclosed in Japanese Patent Publication Kokai Gazette No. 07-242199. According to this track-keeping method, during an operation for changing the ship course from the present course to a new one, the ship turns with a fixed turn rate irrespective of a deviation from the present ship course and takes the new course upon completion of the turn. This track-keeping method controls in different manners in the course keeping operation and in the course change operation so that switching of control is necessary. In addition, since a turn with a fixed turn rate (i.e., feed forward control) is made in the course change operation, there arises the possibility that the deviation from the desired ship course increases.

A position control method for a movable object is disclosed in the Forty-fourth Automatic Control Association Lecture Meeting Gazette No. 01-253, pp 116 to 119. This position control method for a movable object teaches position control of a hover craft by the non-linear optimizing feed-back control, but does not discuss maneuver in consideration of constraints to a planned route. Another position control method for the same movable object is disclosed in "Measurement and Control" Vol. 36, No. 11 (November, 1997), pp776 to 783. This movable object position control method employs a maneuver technique for avoiding obstacles according to which penalty functions associated with the position of a movable object are included in a performance index. This technique is useful where the advent of obstacles is predictable, but cannot cope with situations where obstacles unexpectedly appear or move because the functions are time invariant. In addition, the penalty functions evaluate only the condition at a future time that is to come after an elapse of a time period T from the present time, and therefore, it can be hardly said that the avoidance of obstacles is always done on the optimum route.

SUMMARY OF THE INVENTION

The present invention is directed to overcoming the foregoing drawbacks and a primary object of the invention is therefore to provide a movable object maneuver method and system capable of automatically track-keepig a movable object so as to track an optimum route which passes a desired destination point, while minimizing power in compliance with given constraints.

The object can be accomplished by a method and system for maneuvering a movable object according to the invention, wherein a destination point is set, wherein a thrust value is calculated in real time which minimizes or maximizes a performance index associated with one or more state variables and thrust required for a movable object to reach the destination point and which takes into account non-linear conditions inherent to the movable object, and wherein the movable object is moved based on the calculated thrust value. This obviates not to need for calculating a route beforehand like the prior art and controls the movable object through actual position control while calculating an optimum route directed to the destination point in real time, so that even if disturbances affect the movable object, it can automatically track the optimum route with the minimum power that meets given conditions.

According to the invention, there are provided a method and system for maneuvering a movable object wherein a destination point is set, a thrust value is calculated in real time which minimizes or maximizes a performance index associated with a thrust required for a movable object to reach the destination point, and the movable object is moved based on the calculated thrust value; and wherein one or more transit points arc set on a planned route for the movable object and on or more set transit points arc sequentially set as the destination point. This enables the optimum movement that is not bound by the route more than necessary so that power can be considerably reduced compared to the case of faithful tracking of the route.

The thrust value may be calculated in real time which minimizes or maximizes the performance index over a specified period of time from the present time to a future time. With this arrangement, variations in the performance index over a specified period of time from the present time to a future time is reflected upon the minimizing operation or maximizing operation, so that a movement on the optimal route can be realized with minimum but sufficient operating time.

The performance index may include weights for the state variables, the thrust and each term, the weights may be set as constraints which limit the values of the state variables and the thrust, and the thrust value restricted by the set constraints may be calculated. Thanks to this arrangement, the desired response and performance of the movable object can be obtained by adjusting the weights with the minimum thrust.

The planned route may include only two transit points which are a starting point and a terminal point, and the two transit points may be set to the same point. This makes it possible to carry out route tracking and way point keeping with the same algorithm, which leads to simplification of the control method.

A guide point may be set which consists of a virtual point and moves on the planned route, preceding the movable object, and when the guide point has reached a transit point which is the present destination point, the destination point may be switched to the next transit point. With this arrangement, a delay caused by the dynamic characteristics of the movable object and the actuators can be compensated.

The performance index may include weights for the state variables, the thrust and each term, the weights may be set for each zone of the planned route as constraints which limit the values of the state variables and the thrust, each zone being defined by the transit points, and the thrust value restricted by the constraints corresponding to each transit point may be calculated. By virtue of this arrangement, the desired response and performance of the movable object can be obtained by adjusting the weights with the minimum thrust.

The weights may be set as constants.

Alternatively, the weights may be set as function of positions.

Alternatively, the weights may be set as functions of the position and attitude of the movable object.

Alternatively, the weights may be set as functions of deviation from the state variables at the destination point.

Alternatively, the weights may be set as function of speeds. With any of the above arrangements, the maximum speed of the movable object, for instance, can be set by properly setting the weights.

Alternatively, the weights may be set as function of times. With this arrangement, the movable object can be automatically stopped or started, for instance, by setting the weight for the speed of the movable object so as to properly vary with respect to time.

Alternatively, the weights may be set as functions of an event signal. With this arrangement, the speed of the movable object can be varied in accordance with an event signal, for instance, by setting the weight for the speed of the movable object so as to properly vary relative to an event signal, and it becomes possible to stop or start the movable object upon receipt of an event signal.

Alternatively, the weights may be set as functions of data on obstacles. With this arrangement, the movable object can be allowed to avoid obstacles, by setting the weight for deviation from the route so as to properly vary in accordance with data on the obstacles.

Upon detection of an event, the destination point may be set by switching it from the present location to any of other points than the present location. With this arrangement, the movable object can be stopped or started, for instance, by causing an event through pressing of an operation button.

The performance index may include the state variables and the thrust as variables and the state of the movable object may be estimated, using a non-linear or linear state observer. This makes it possible to properly carry out the optimizing control, by estimating the state variables which is directly undetectable.

Necessary items including the target point and the performance index may be set using a human-machine interface. This enables easy setting of necessary items.

The movable object may be a ship.

Alternatively, the movable object may be an underwater craft.

Alternatively, the movable object may be an aircraft.

These objects as well as other objects, features and advantages of the invention will become apparent to those skilled in the art from the following description with reference to the accompanying drawings.

BRIEF DESCRIPTION OF THE DRAWINGS

FIGS. 6(a), 6(b) are diagrammatical views showing an example of setting of a weight for an performance index, wherein FIG. 6(a) shows the condition of a route whereas FIG. 6(b) shows changes in the weight.

FIG. 7 is a table exemplifying the definitions of constraint levels.

FIGS. 8(a), 8(b) are views each showing a controlled state of a ship, wherein FIG. 8(a) shows a present embodiment whereas FIG. 8(b) shows a prior art example.

FIGS. 17(a) to 17(c) are diagrammatic views each illustrating an HMI route setting screen according to a second embodiment of the invention, wherein FIG. 17(a) shows setting of a KEEP OUT zone, FIG. 17(b) shows a state in which a route has been partly set, and FIG. 17(c) shows a state in which setting of the route has been completed.

FIGS. 19(a) to 19(g) are diagrammatical views showing examples of setting of weights for a position and for an heading angle, wherein FIGS. 19(a) to 19(c) show examples of setting of a weight for a position, FIG. 19(d) shows an example of setting of the lengths of constant weight zones as functions of a distance to a way point serving as the destination point, and FIGS. 19(e) to 19(g) show examples of setting of a weight for an heading angle.

FIGS. 21(a) to 21(o) show examples of curves each representing changes in a weight for a state variables.

FIGS. 22(a), 22(b) are views showing the operation and structure of a ship maneuver system according to a fifth embodiment of the invention, wherein FIG. 22(a) shows an action for avoiding an obstacle, whereas FIG. 22(b) shows changes in a weight for a position with respect to the y direction.

FIG. 27 is a table showing the definitions of state variables in an underwater craft according to Example 9.

FIGS. 28(a),28(b) are views showing a simulation result of ship control according to the conventional PID control law, wherein FIG. 28(a) shows a ship trajectory and FIG. 28(b) shows variations in rudder angles, FIGS. 29(a),29(b) are views showing a simulation result of the ship control according to the conventional PID control law, wherein FIG. 29(a) shows variations in attitude angles and FIG. 28(b) shows variations in ship speed and yaw rate.

FIGS. 30(a),30(b) are views showing a simulation result of ship control according to Example 9, wherein FIG. 30(a) shows a ship trajectory and FIG. 30(b) shows variations in rudder angles.

FIGS. 31(a),31(b) are views showing a simulation result of the ship control according to Example 9, wherein FIG. 31(a) shows variations in attitude angles and FIG. 31(b) shows variations in ship speed and yaw rate.

DETAILED DESCRIPTION OF THE PREFERRED EMBODIMENTS

With reference to the accompanying drawings, preferred embodiments of the invention will be hereinafter described.

First Embodiment

Figure 1:
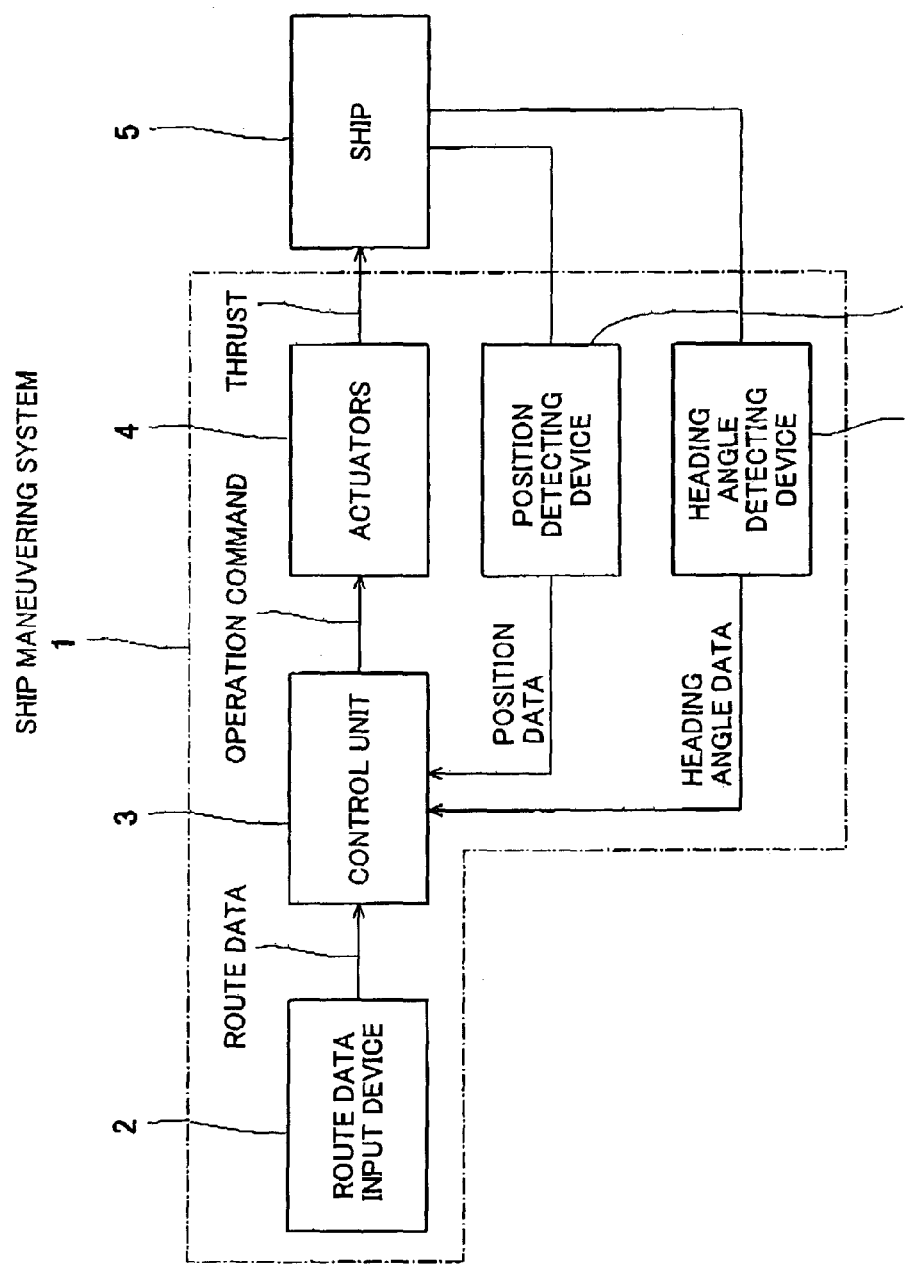
FIG. 1 is a block diagram showing a structure of a control system of a movable object maneuver system according to a first embodiment of the invention.

FIG. 1 is a block diagram showing a structure of a control system of a movable object maneuver system according to a first embodiment of the invention.

Figure 2:
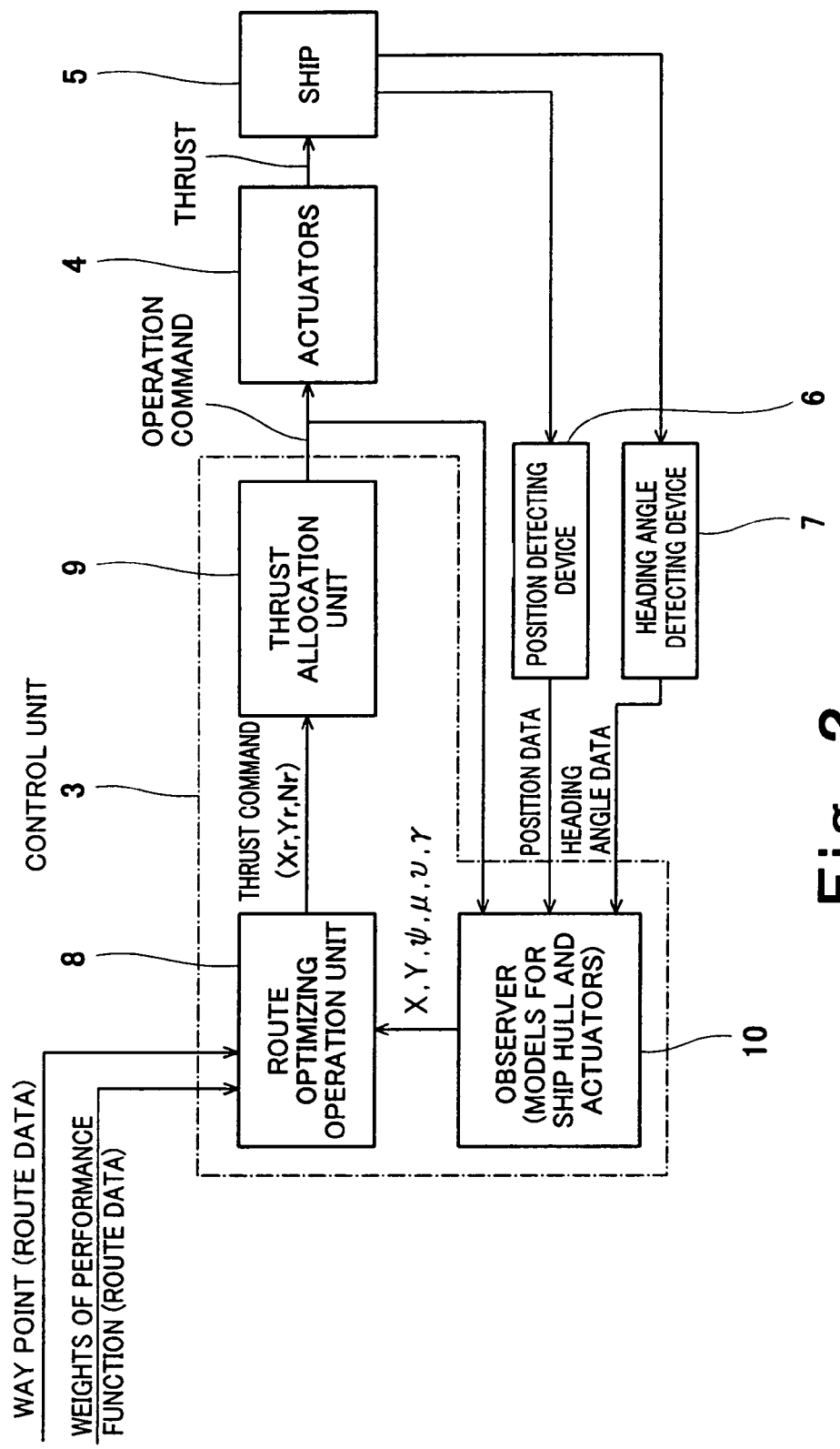
FIG. 2 is a block diagram showing a structure of the control unit shown in FIG. 1.
Figure 3:
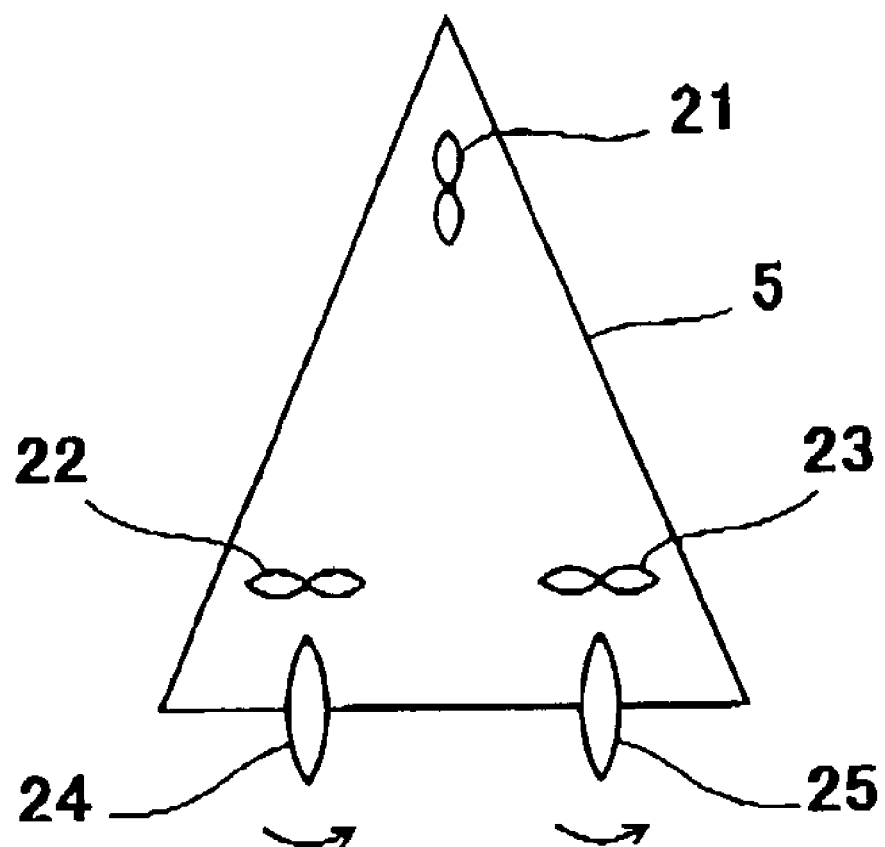
FIG. 3 diagrammatically shows a layout of individual actuators.

FIG. 2 is a block diagram showing a structure of the control unit shown in FIG. 1. FIG. 3 diagrammatically shows a layout of individual actuators.

Referring to FIG. 1, a ship maneuver system 1 exemplifies the movable object maneuver system in the present embodiment. In this embodiment, the movable object is a ship 5. The ship maneuver system 1 has a route data input device 2, a control unit 3, actuators 4, a position detecting device 6, and an heading angle detecting device 7.

The position detecting device 6 is constituted, for instance, by a GPS (Global Positioning System) and measures the position of the ship 5 to output as positional data. The heading angle detecting device 7 is constituted, for instance, by a gyro compass and measures the heading of the ship 5 to output as data. The route data input device 2 is constituted by an HMI (Human-machine interface) having a display connected to a computer, a mouse, a key board and the like. The route data input device 2 functions to input, for setting, route data to the control unit 3, the route data including a planned route (planned ship course: hereinafter referred to as "route") and the degrees of constraints. The control unit 3 is constituted by a computer and performs non-linear optimizing feed-back control on the ship 5, based on the route data input from the route data input device, position data input from the position detecting device 6 and heading angle data input from the heading angle detecting device 7. More concretely, the control unit 3 outputs operation commands for the optimizing feed-back control. The actuators 4 produce thrust according to the operation commands output from the control unit 3 to move (maneuver) the ship 5. In the present embodiment, the actuators 4 are composed of, as shown in FIG. 3, individual actuators respectively arranged in the ship 5, that is, one thruster 21, two propellers 22, 23 and two rudders 24, 25. With these actuators, the ship 5 can be moved in a desired two-dimensional direction and arbitrarily turned.

Next, the control unit 3 will be explained in detail. In FIG. 2, the control unit 3 includes a route optimizing operation unit 8, a thrust allocation unit 9 and an observer 10, which are realized by specified software. The route optimizing operation unit 8 performs route optimizing operation to output thrust commands, using an algorithm for minimizing a performance index (described later). The thrust allocation unit 9 optimally allocates the thrust commands output from the route optimizing operation unit 8 to the individual actuators 21 to 25 shown in FIG. 3 and outputs them as operation commands. The observer 10 inputs the state variables of the performance index to be used for the route optimizing operation to the route optimizing operation unit 8. The basic configuration of the observer 10 is known and therefore will be briefly described herein. In the observer 10, the operation commands output from the thrust allocation unit 9 are input to mathematical models of the ship 5 and the actuators 4 as manipulated variables. The output from the mathematical models are compared with the position data and heading angle data on the ship 5 (i.e., the outputs of the position detecting device 6 and the heading angle detecting device 7) and the differences are input to the mathematical models. Then, state variables (x, y, $\Psi$, u, v, r) are taken from proper locations of the mathematical models to input to the route optimizing operation unit 8 as estimated values for the state variables of the ship 5.

Although the route optimizing operation unit 8 is separated from the thrust allocation unit 9 in the present embodiment, the thrust commands output from the route optimizing operation unit 8 may be arranged as thrust commands directed to the actuators.

Figure 4:
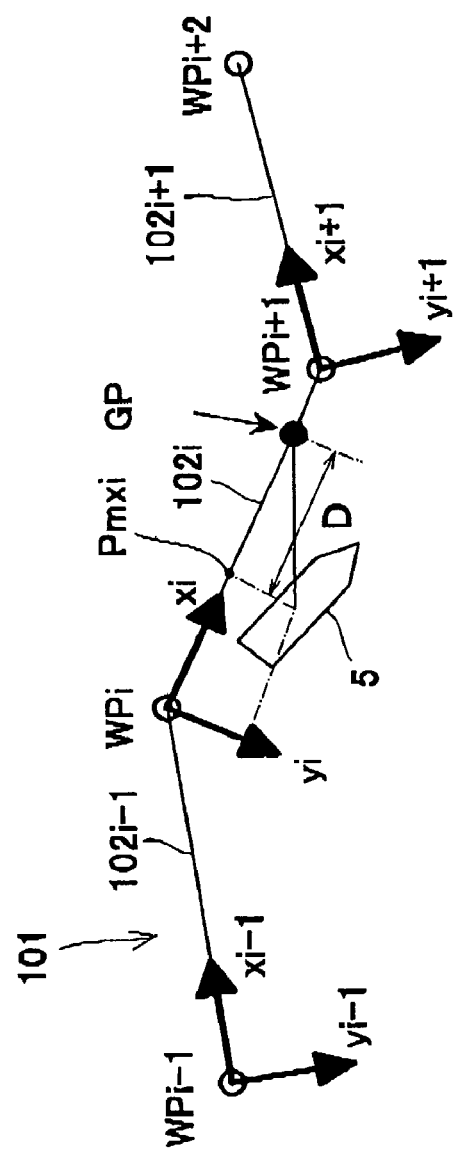
FIG. 4 diagrammatically shows a method of setting a route.
Figure 5:
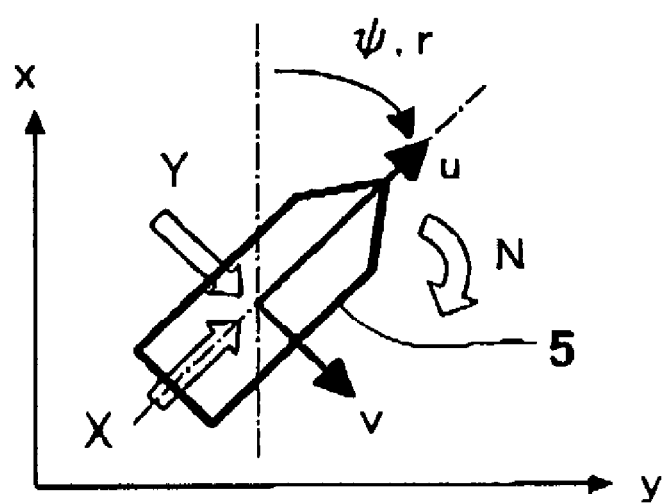
FIG. 5 is a graph showing definitions of state variables.

Next, the route optimizing operation executed in the route optimizing operation unit 8 will be described in detail. FIG. 4 diagrammatically shows a method of setting a route. FIG. 5 is a graph showing the definitions of state variables. FIGS. 6(a),(b) are diagrammatical views showing an example of setting of a weight for an performance index, wherein FIG. 6(a) shows the condition of a route whereas FIG. 6(b) shows changes in the weight. FIG. 7 is a table exemplifying the definitions of constraint levels.

The definition of a route will be first explained.

In this embodiment, a plurality of transit points (hereinafter referred to as "way points") WP are assumed to exist on a virtual plane as shown in FIG. 4 and straight lines connecting the plural way points WP are defined as a route 101. While sequentially switching the plural way points WP on the route 101 to set as a destination point, the optimizing control is performed.

Concretely, the route 101 is defined in the global coordinate system, while a local coordinate system $x_i$-$y_i$ is defined for every section 102 between two way points on the route 101 (hereinafter simply referred to as "section"). Although this local coordinate system $x_i$-$y_i$ can be arbitrarily defined, it is defined herein such that the way point $WP_i$ is set as an origin point and the $x_i$ axis coincides with a section $102_i$ which extends forward from the way point $WP_i$. Until the ship 5 arrives at the next way point WP, control is performed with the local coordinate system corresponding to the present way point WP. Specifically, the position and heading angle of the ship 5 is converted to the local coordinate system corresponding to each way point WP. And, until the ship 5 reaches the next way point $WP_{i+1}$, the terminal condition of the performance index is regarded as the state of the next way point $WP_{i+1}$ on the local coordinate system $x_i$-$y_i$ corresponding to the present way point $WP_i$ and weights for the performance index are determined for every section 102. At the time when the ship 5 has reached the next way point $WP_{i+1}$, the coordinate system is switched to the local coordinate system $x_{i+1}$-$y_{i+1}$ corresponding to the way point $WP_{i+1}$ and the weights for the performance index are switched to those for the section 102$_{i+1}$.

For simplicity, it is explained in the above description that the coordinate system and weights for the performance index are changed (that is, the destination point is changed) at the time when the ship 5 has arrived at a way point WP. However, in reality, the ship 5 is guided to move on the route 101 and therefore does not accurately track the route 101. In other words, the ship 5 does not necessarily pass through a particular way point WP. In such a case, there arises a need to make a sign for switching of the destination point, instead of the arrival of the ship 5 at a way point WP, To cope with this, the present invention is designed such that a guide point GP which moves on the route 101 in accordance with the movement of the ship 5 is set and the destination point is changed whenever the guide point GP has reached a way point WP.

The guide point GP is positioned a distance D ahead of a projection point $P_{mxi}$ on the axis $x_i$ of the local coordinate system for the center of the ship 5 and moves at the same speed as the moving speed of the projection point $P_{mxi}$. The distance D is a function of, for instance, sailing speed, lateral deviation from the route 101, heading angle deviation, the distance to a way point WP serving as the destination point, the values of weights for a preset performance index and the like, but not limited to these factors.

By setting the guide point GP so as to be ahead of the ship 5, delay due to the dynamic characteristics of the ship 5 and the actuators 4 can be compensated.

Next, the algorithm for the route optimizing operation will be described.

In this algorithm, the optimum value, which minimizes the performance index such as described by the equation (2) where t is a given time and t+T is a future time, is calculated using the state equation for the ship such as the equation (1) (i.e., optimization over a time period T from a time t to a future time t+T), and only the initial value u(t) of the optimizing control is given as an actual manipulated variables.

$$\dot{x}(t)=f(x(t),u(t),p(t)) \quad (1)$$

where x(t) is a vector of state variables, u(t) is a vector of manipulated variables, and p(t) is a given time variant parameter.

$$J = \Phi(x(t+T), x_{ref}(t+T), p(t+T), S(t+T)) \quad (2)$$
$$+ \int_t^{t+T} L(x(\tau), x_{ref}(\tau), u(\tau), p(\tau), Q(\tau), R(\tau))d\tau$$

where $x_{ref}$ is a target state (the position and state of the ship at a WP serving as the destination point), S is a weight for a terminal state, Q is a weight for a state variables and R is a weight for manipulated variables.

In this performance index, appropriate functions are selected for $\Phi$ and L, appropriate values are set for S, Q and R, and u(t) which minimizes the performance index is obtained. Then, an operation command value for the actuators is calculated, using u(t) as a command value for thrust for the ship. This arithmetic operation is performed in real time. In this performance index, the first term is for evaluating the state at a future time which comes a specified time after the present time, and the second term is for evaluating the state variables and manipulated variables (thrust) over a specified period of time from the present time to the future time.

The weights S, Q and R of the performance index are variant so that their values can be arbitrary changed depending on data on the KEEP OUT zone, the distance to the way point WP serving as the destination point and user's instructions.

In the present embodiment, the following equation (3) is defined as a preferable concrete example of the performance index of the equation (2).

$$J = \frac{1}{2}\left[\sum_{i=1}^{9} S_{fi}(x_{refi} - x_i)^2\right]_{t+T} + \frac{1}{2}\int_t^{t+T}\left\{\sum_{i=1}^{9} q_i(x_{refi} - x_i)^2 + \sum_{i=1}^{9} r_i u_i^2\right\}dt \quad (3)$$

Herein, $x_1=x$, $x_2=u$, $x_3=y$, $x_4=v$, $x_5=\Psi$, $x_6=r$, $x_7=X$, $x_8=Y$, $x_9=N$, $u_1=Xr$, $u_2=Yr$, and $u_3=Nr$. They conform to the following dynamic equations.

$$(M+mx)\dot{u}=Mvr+Mx_G r^2+X_H+X \quad (4)$$

$$(M+my)\dot{v}+Mx_G \dot{r}=-Mur+Y_H+Y \quad (5)$$

$$(Izz+Mx_G^2+Jzz)\dot{r}+Mx_G \dot{v}=-Mx_G ur+N_H+N \quad (6)$$

$$\dot{x}=u\cos\Psi-v\sin\Psi \quad (7)$$

$$\dot{y}=u\sin\Psi+v\cos\Psi \quad (8)$$

$$\dot{\Psi}=r \quad (9)$$

$$X = \frac{Kx}{Tx\cdot s+1}Xr \quad (10)$$

$$Y = \frac{Ky}{Ty\cdot s+1}Yr \quad (11)$$

$$N = \frac{Kn}{Tn\cdot s+1}Nr \quad (12)$$

Herein, the equations (10) to (12) are the approximate expressions of the dynamic characteristics of the thrust allocation unit 9 and the actuators 4 shown in FIG. 2. Although each dynamic characteristic is approximated by a primary delay system herein, the approximation is not limited to this but an arbitrary equation may be employed.

As shown in FIGS. 4 and 5, the parameters of the equations (3) to (12) are as follows.

x: the x coordinate of the center of the ship; y: the y coordinate of the center of the ship; $\Psi$: the heading angle of the ship; u; the speed of the ship in a fore-off direction (longitudinal direction); v: the speed of the ship in a lateral direction (widthwise direction); r: the angular speed of the ship; X: a thrust working on the ship in its fore-off direction; Y: a thrust working on the ship in its lateral direction; N: a moment about the center of the ship; Xr: a command value indicative of a thrust to be exerted in the fore-off direction of the ship; Yr: a command value indicative of a thrust to be exerted in the lateral direction of the ship; Nr: a command value indicative of a moment about the center of the ship; M: the mass of the ship; mx: an added mass in the fore-off direction; my: an added mass in the lateral direction; Izz: a moment of inertia; Jzz: an added moment of inertia; $X_G$: the distance between the center and gravity point of the ship; $X_H$: a fluid force working on the ship in its fore-off direction; $Y_H$: a fluid force working on the ship in its lateral direction; $N_H$: a fluid moment working around the center of the ship; Kx, Ky, Kn: coefficients representative of an amplitude ratio of output from input; Tx, Ty, Tn: coefficients representative of a time constant of the first order time delay.

As discussed earlier, the weights $S_{fi}$, $q_i$, $r_i$ of the performance index of the equation (3) are variant, so that their values are changed according to data on KEEP OUT zones, the distance to a way point WP serving as the destination point, the degree of a route constraint and others.

For example, if a region 201 which is off-limits for ships (e.g., KEEP OUT zones) exists beside a route 101, a weight $q_3$ for y is set taking account of the region 201 as shown in FIG. 6(b). More specifically, with respect to the direction of the $y_i$ axis in a local coordinate system, the weight $q_3$ is set to take a constant value V0 within the area Where the region 201 does not exist and to rapidly increase in the area where the region 201 exists.

In this case, a zone A1 where the value of the weight is constant and a zone A2 were the value of the weight increases are set based on the route 101, taking account of the condition of the deviation (i.e., the difference between the state variables at the destination point and the state variables at the present location). Since the weight does not take discrete values, the weight is set to have continuous values. The zone A1 where the weight has a constant value is changed according to, for instance, the distance to the way point WP serving as the destination point. The degree of a constraint to the route 101 is adjusted, depending on the length of the zone A1 where the weight has a constant value.

The degree of this constraint can be set so as to vary continuously, but, in the present embodiment, it is divided into, for example, five levels, "Non", "Loose", "Middle", "Tight", "Strict", in proportion to the length of the zone A1 where the weight has a constant value, as shown in FIG. 7.

The lower limit value V0 of the weight is changed depending on the distance to the way point WP serving as the destination point or the like. The zone A2 where the weight increases can be set for both the starboard side and port side of the ship. The degree of the route constraint may be set by changing the weight for other state variables such as the heading angle or speed of the ship, similarly to the case where the weight for the position of the ship is changed.

Figure 8A:
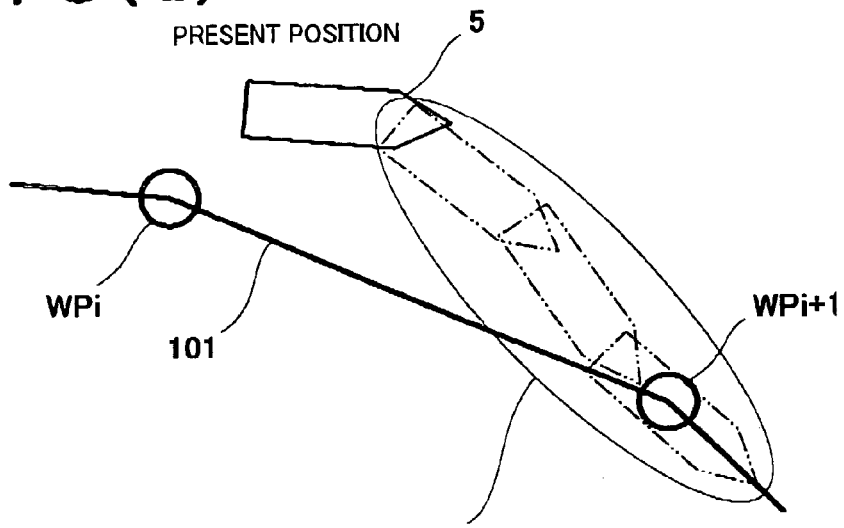
Figure 8B:
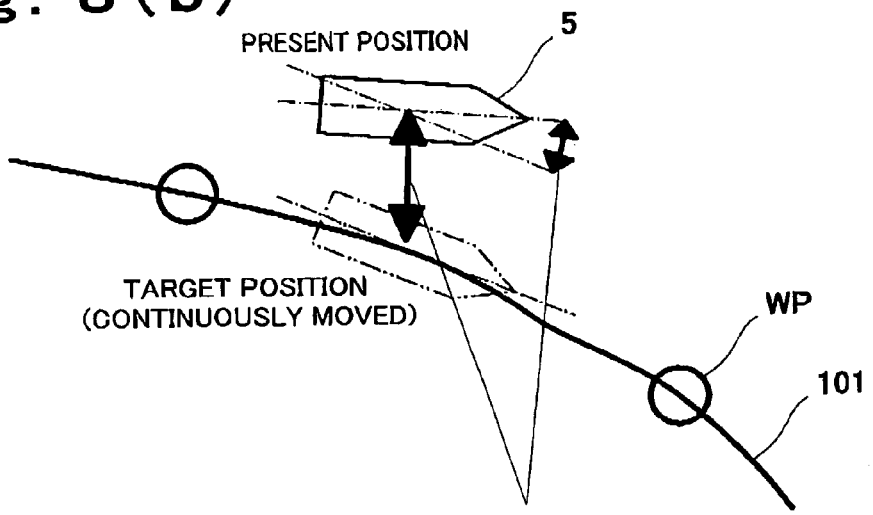

Next, the operation of the ship maneuver system 1 having the above structure (the ship maneuver method) will be described. FIGS. 8(a),8(b) are views each showing a controlled state of a ship, wherein FIG. 8(a) shows a present embodiment whereas FIG. 8(b) shows a prior art example, Referring to FIGS. 1 to 4, the route data input device 2 sends way points WP, the state variables at the destination point, the leading distance D of the guide point and weights (including the degree of a route constraint) for each section 102 and the like to be input to the control unit 3 for setting. Then, the route optimizing operation unit 8 calculates, in real time, a two-directional force (thrust commands Xr, Yr) and a moment (thrust command Nr) which minimize the performance index of the equation (3). These calculated thrust commands are allocated to the individual actuators 21 to 25 of the actuators 4 by the thrust allocation unit 9, and the allocated thrust commands are output to the actuators 4 as operation commands. Then, the individual actuators 21 to 25 output thrusts based on the operation commands. According to the output thrusts, the ship 5 moves. During this time, the position detecting device 6 and the heading angle detecting device 7 measure the position and heading angle of the ship 5 respectively and the observer 10 inputs the present state variables based on the measured position, the measured heading angle and the operation commands output from the thrust allocation unit 9 to the route optimizing operation unit 8. As a result, the ship 5 is controlled so as to track an optimum route from the present location to the way point WP serving as the destination point, as shown in FIG. 8(a). When the guide point GP shown in FIG. 4 has reached the way point WP serving as the destination point, the route optimizing operation unit 8 switches the destination point to the next way point WP and controls the ship 5 similarly. At that time, the degree of the route (101) constraint imposed on the ship 5 varies according to the weights for the performance index set for every section 102.

The following is understood from the comparison between the control of the present embodiment and the control of the prior art: In the prior art, the ship is controlled so as to null the deviation from the target value as shown in FIG. 8(b) and therefore the ship sails, outputting necessary power to null the deviation even if disturbances such as winds and currents affect on the ship, so that a great amount of power is consumed. In contrast with this, the present embodiment is designed such that the ship is controlled while calculating an optimum route to the destination point in real time, so that even if disturbances occur, the ship can track the optimum route with power minimized in compliance with given conditions, provided that the ship sails within a preset constraint degree range.

Next, the degree of the route (101) constraint on the ship 5 will be explained according to examples based on simulations.

EXAMPLE 1

Figure 9:
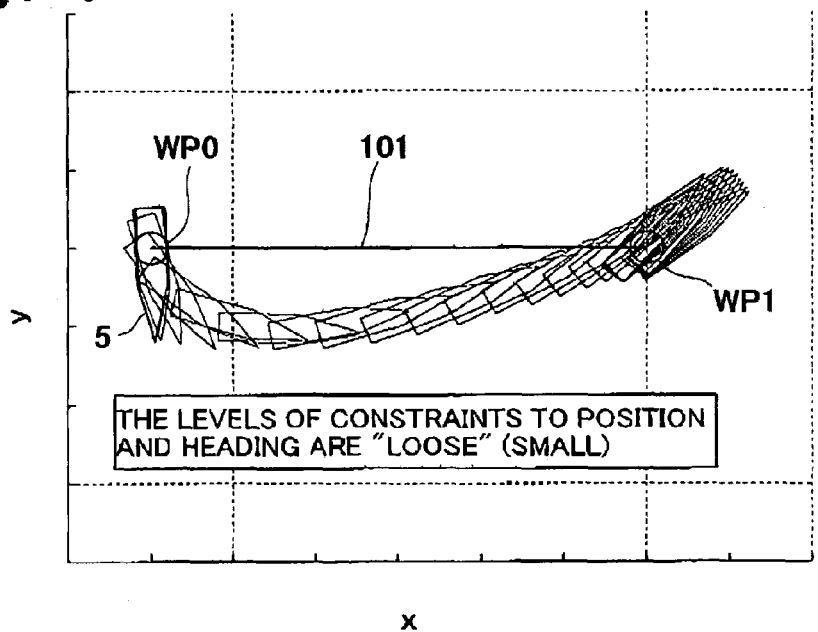
FIG. 9 illustrates a simulation result according to Example 1.

FIG. 9 shows a simulation result associated with Example 1. In FIG. 9, the abscissa represents the x coordinate whereas the ordinate represents the y coordinate. Thick lines represent the target position and target heading angle of the ship 5 at the way points WP0 and WP1, respectively. While the ship 5 moves from the way point WP0 to the way point WP1 (with its position changing), the heading angle of the ship 5 changes from the heading angle at the way point WP0 to the heading angle at the way point WP1.

Where the optimizing control is performed by use of a performance index in which each term is weighed like the equations (1) and (3), if the weights are increased, the performance index increases with the increase in the weights, so that the state of the ship does not become close to the zone where the weights increase. In this example, the weights for the position and heading angle of the ship 5 are set to increase, but the constraint level for them is set to "Loose" (small: see FIG. 7) and therefore the degree of the route constraint due to the weights is small. Therefore, the ship 5 moves from the way point WP0 to the way point WP1, tracking a course that is relatively distant from the route 101.

EXAMPLE 2

Figure 10:
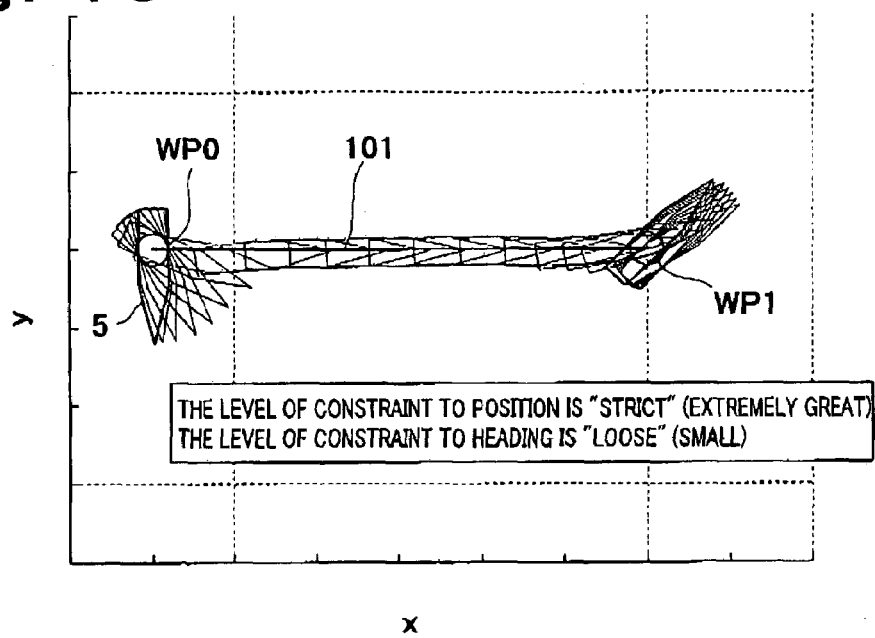
FIG. 10 illustrates a simulation result according to Example 2.

FIG. 10 shows a simulation result associated with Example 2. In FIG. 10, the abscissa represents the x coordinate whereas the ordinate represents the y coordinate, In this example, the constraint level with respect to the position of the ship is set to "Strict" (extremely great: see FIG. 7), the constraint level with respect to the heading angle of the ship is set to "Loose" (small). Accordingly, the ship 5 substantially sails on the route 101, moving from the way point WP0 to the way point WP1.

EXAMPLE 3

Figure 11:
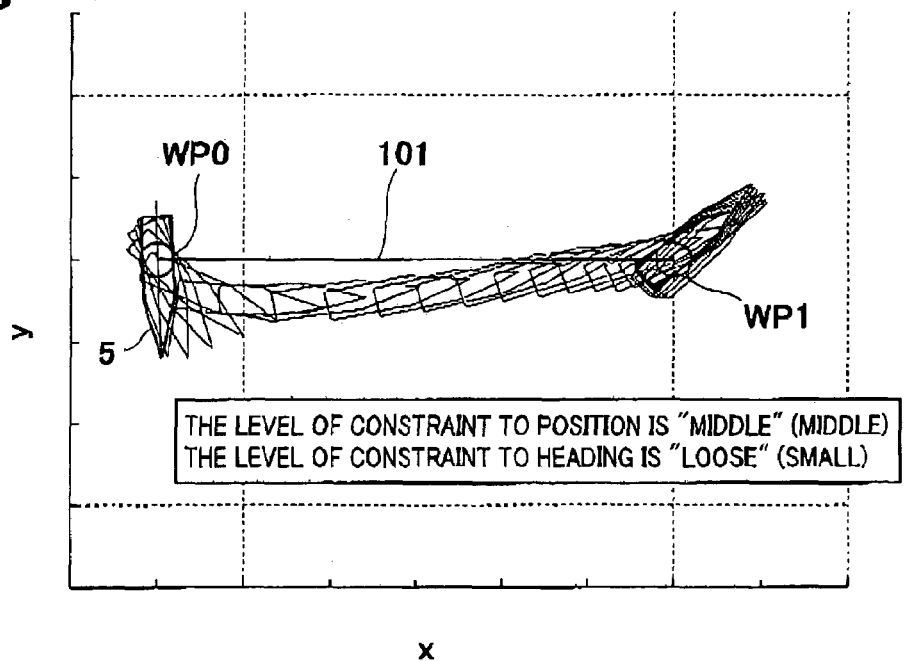
FIG. 11 illustrates a simulation result according to Example 3.

FIG. 11 shows a simulation result associated with Example 3. In FIG. 11, the abscissa represents the x coordinate whereas the ordinate represents the y coordinate. In this example, the level of the constraint to the position of the ship is set to "Middle" (middle; see FIG. 7) and the level of the constraint to the heading angle of the ship is set to "Loose" (small). Therefore, the ship 5 tracks a course that is slightly distant from the route 101, moving from the way point WP0 to the way point WP1.

EXAMPLE 4

Figure 12:
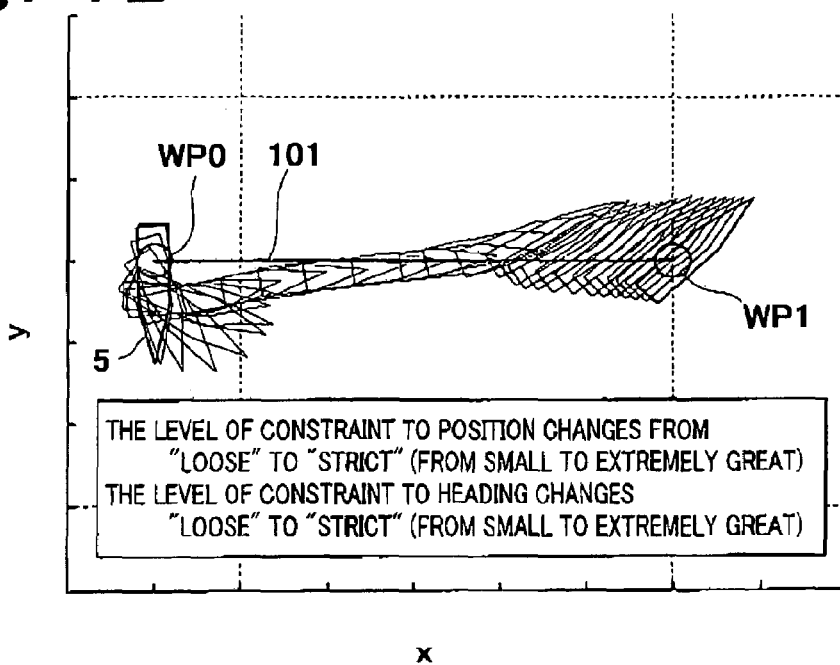
FIG. 12 illustrates a simulation result according to Example 4.

FIG. 12 shows a simulation result associated with Example 4. In FIG. 12, the abscissa represents the x coordinate whereas the ordinate represents the y coordinate. In this example, the levels of the constraints to the position of the ship and to the heading angle of the ship are both set to change from "Loose" (small) to "Strict" (extremely great). Therefore, the ship 5 is substantially located on the route 101 and its heading angle becomes close to the target heading angle at the way point WP1 when it sails on the way from the way point WP0 to the way point WP1. When sailing from there to the way point WP1, the ship substantially tracks the route 101 with its heading angle slightly changing.

As apparent from the foregoing examples 1 to 4, with the control of the present embodiment, the ship 5 can be moved between way points WP, taking a desired course and attitude, by appropriately setting weights for the position and heading angle of the ship 5. These weights can be readily set by the operator's sensuous judgement.

Next, automatic mooring will be explained by way of an example based on a simulation.

EXAMPLE 5

Figure 13:
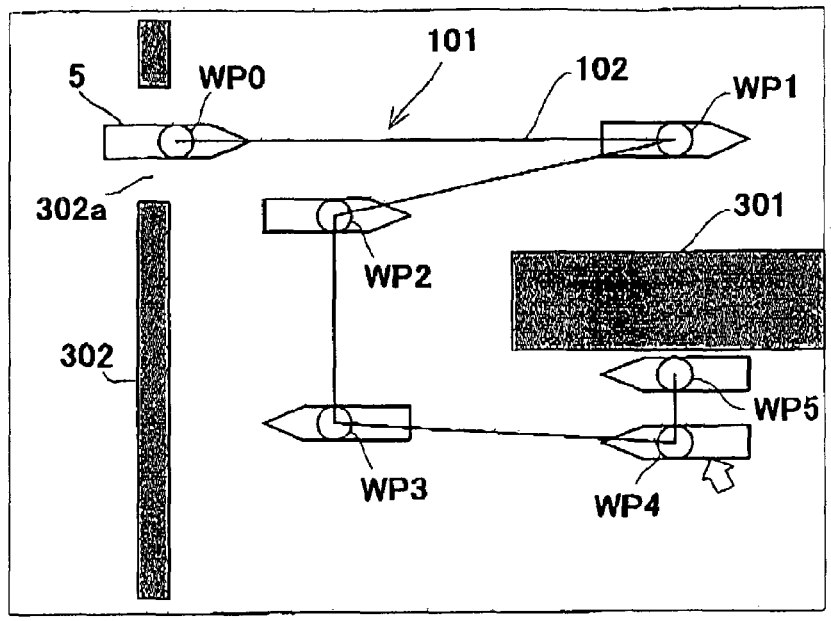
FIG. 13 diagrammatically illustrates a shipping route employed in a simulation associated with Example 5.
Figure 14:
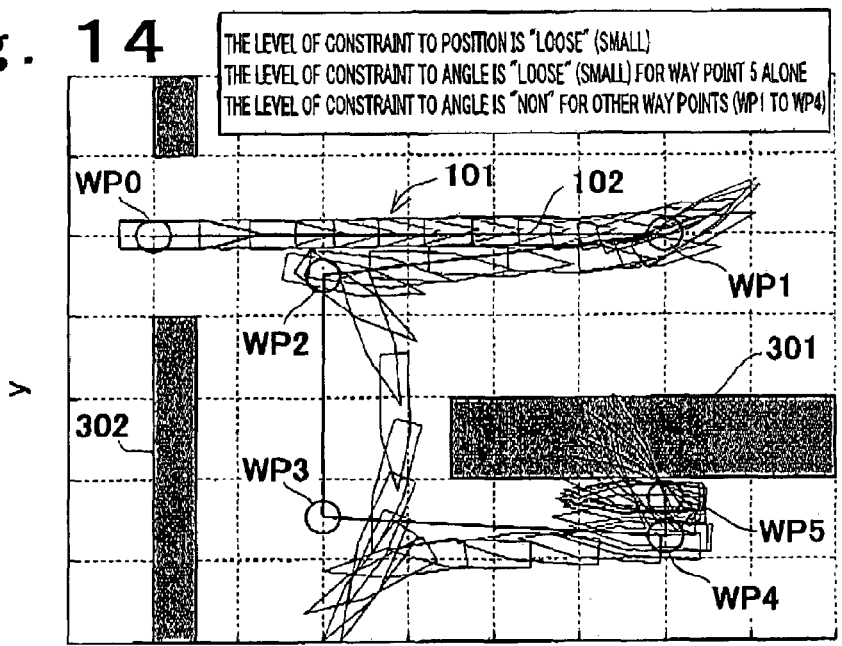
FIG. 14 illustrates a simulation result according to Example 5.

FIG. 13 diagrammatically illustrates a shipping route employed in the simulation of Example 5. FIG. 14 illustrates a simulation result according to Example 5. In FIG. 14, the abscissa represents the x coordinate whereas the ordinate represents the y coordinate.

As shown in FIG. 13, in the simulation of this example, a jetty 302 having an opening 302a at its center is located in the port and a pier 301 is located at the right far side of the opening 302a. A first way point WP0 is set at the approximate center of the opening 302a of the jetty 302, and a second way point WP1 is set on the left hand of the pier 301 in front of the opening 302a. Third to fifth way points WP2 to WP4 are set to depart from the second way point WP1, surrounding the leading end of the pier 301. A sixth way point WP5 is set alongside the pear 301 at a position straight ahead of the fifth way point WP4. The heading angle of the ship 5 at the first to third way points WP0 to WP2 is the same as the heading angle which the ship takes when coming into the port and the heading angle of the ship 5 at the fourth and sixth way points WP3 to WP5 is opposite to the heading angle at the time of entry into the port.

In this example, the level of the constraint to the position of the ship 5 is set to "Loose" (small) for all the sections 102. The level of the constraint to the heading angle of the ship 5 is set to "Loose" for the section 102 between the fifth way point WP4 and the sixth way point WP5 and to "Non" (nothing: See FIG. 7) for other sections 102. As a result, when the ship 5 was sailing from the third way point WP2 to the fourth way point WP3, it came near the pier 301, deviating from the route 101, and when the ship 5 came alongside the pier 301, it made a big turn, hitting the pier 301. The result was thus undesirable.

EXAMPLE 6

Figure 15:
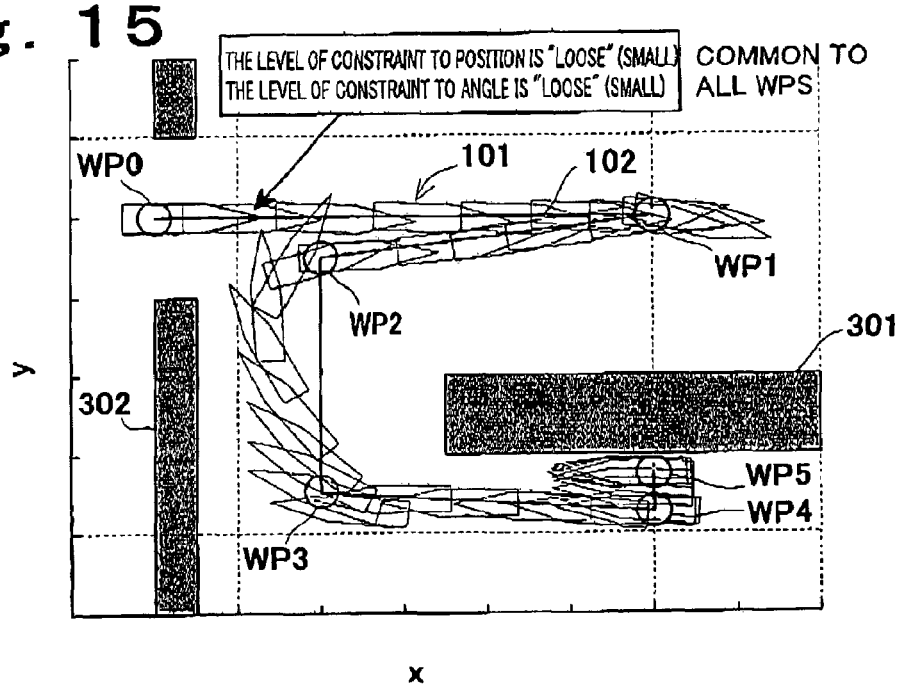
FIG. 15 illustrates a simulation result according to Example 6.

FIG. 15 shows a simulation result associated with Example 6. In FIG. 15, the abscissa represents the x coordinate whereas the ordinate represents the y coordinate. In this example, the levels of the constraints to the position of the ship 5 and to the heading angle of the ship 5 are both set to "Loose" (small) for all the sections 102. As a result, a collision between the ship 5 and the pier 301 could be avoided, but the ship 5 made a turn with a large radius while sailing from the third way point WP2 to the fourth way point WP3 so that the bow of the ship excessively came close to the jetty 302, causing a dangerous situation.

EXAMPLE 7

Figure 16:
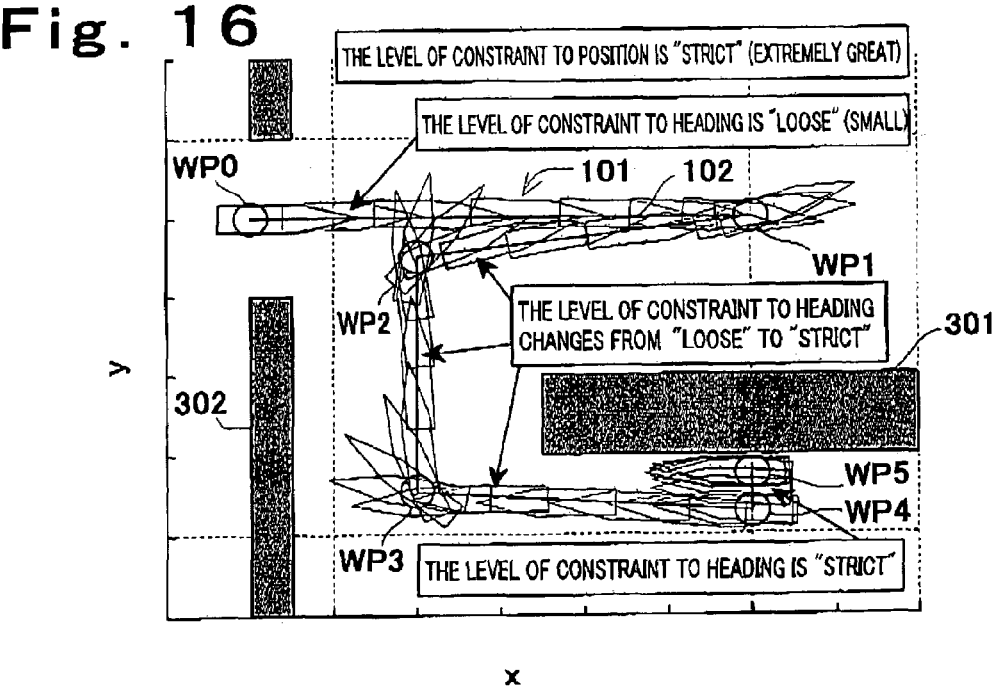
FIG. 16 illustrates a simulation result according to Example 7.

FIG. 16 shows a simulation result associated with Example 7, In FIG. 16, the abscissa represents the x coordinate whereas the ordinate represents the y coordinate. In this example, the level of the constraint to the position of the ship 5 was set to "Strict" (extremely great) for all the sections 102. The level of the constraint to the heading angle of the ship 5 was set to "Loose" (small) for the section 102 between the first way point WP0 and the second way point WP1; set to change from "Loose" (small) to "Strict" (extremely great) for each section 102 between the second way point WP1 and the fifth way point WP4; and set to "Strict" (extremely great) for each section 102 between the fifth way point WP4 and the six way point WP5. As a result, the ship 5 substantially sailed on the route 101 between the third way point WP2 and the fourth way point WP3 and turned in the vicinity of the fourth way point 3, so that the risk that the bow came close to the jetty 302 could be avoided and a good result was obtained.

It will be apparent from the foregoing examples 5 to 7 that the control of the present embodiment enables adequate automatic mooring of the ship 5 by properly setting a route and properly selecting weights for the position and heading angle of the ship 5.

Second Embodiment

A second embodiment of the present invention exemplifies the preferred HMI.

Figure 17A:
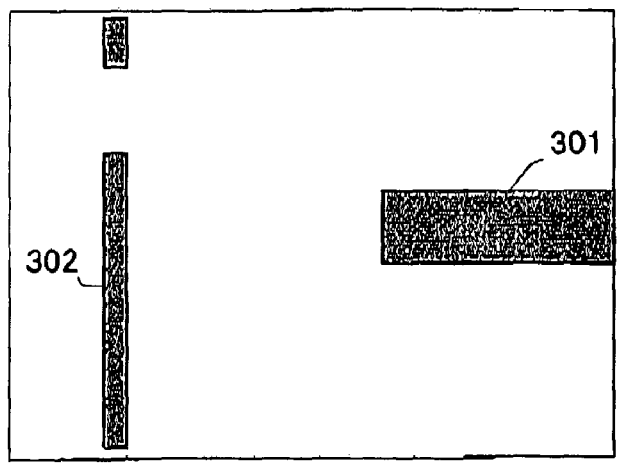
Figure 17B:
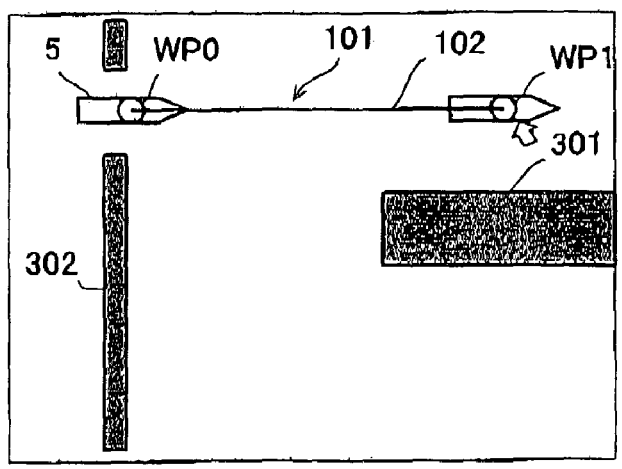
Figure 17C:
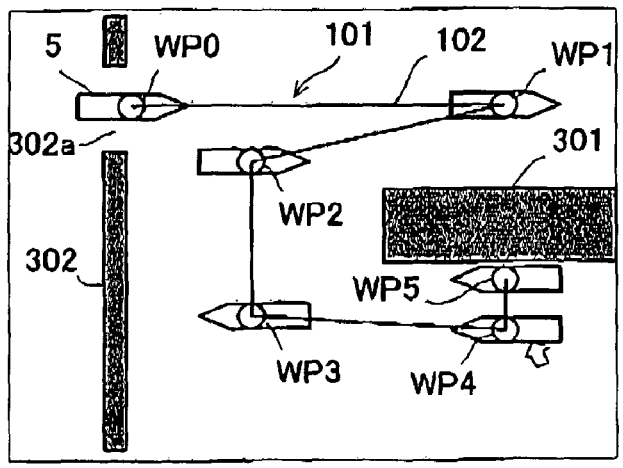

FIGS. 17(a) to 17(d) are diagrammatic views each illustrating an HMI route setting screen (an image of screen) according to the present embodiment, wherein FIG. 17(a)

shows setting of a KEEP OUT zone, FIG. 17(b) shows a state in which a route has been partly set, and FIG. 17(c) shows a state in which setting of a route has been completed.

The HMI of this embodiment is constituted by, as previously discussed in the-first embodiment, a display unit such as a display connected to the control unit 3 (computer; see FIG. 1) and an input device such as a mouse and a key board. Setting of desired items in a computer by inputting specified data with an input device while a specified screen being displayed on the screen of the display unit is generally known, and therefore, the following discussion on a route and setting of the degree of the route constraint will be presented in conjunction with the setting screens alone and the software will not be discussed.

As shown in FIG. 17(a), according to the present embodiment, a route setting screen is first displayed on the display unit and then, KEEP OUT zones such as the obstacles 301, 302 are manually set, operating the mouse or the like on the setting screen. It is also possible to automatically set the KEEP OUT zones by inputting GPS data or MAP data to the control unit 3.

Thereafter, the way points WP0 to WP5 are specified by operating the mouse, as shown in FIGS. 17(b) and 17(c). Then, the position data on the way points WP0 to WP5 is transferred to and stored in the control unit 3 (setting). The way points WP0 to WP5 are sequentially connected by straight lines which are, in turn, displayed on the screen. In this way, a route is set.

Figure 18:
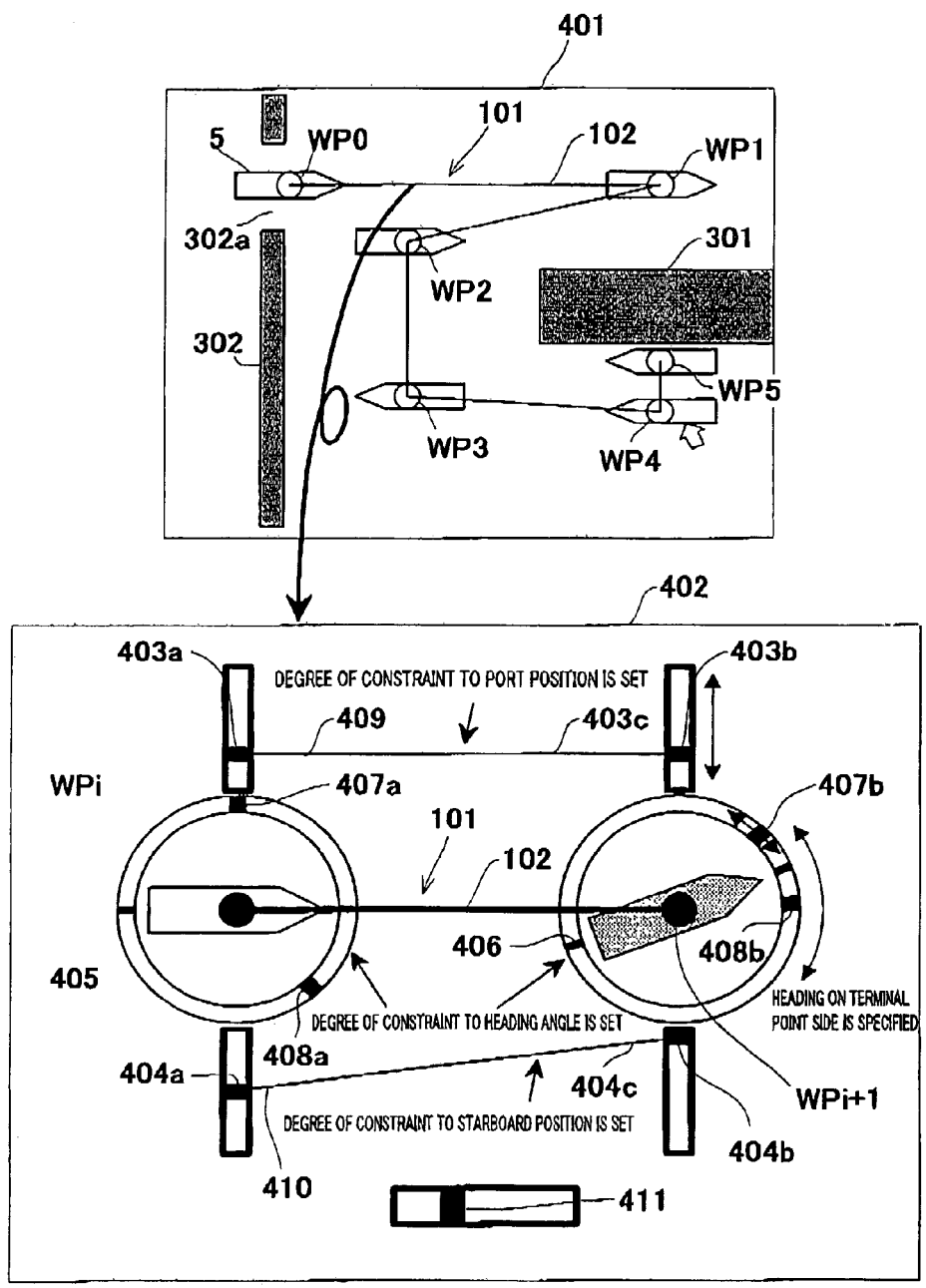
FIG. 18 diagrammatically shows setting of the degree of a route constraint.

Next, setting of the degree of the route constraint will be explained. FIG. 18 diagrammatically shows setting of the degree of the route constraint.

As shown in FIG. 18, after a desired section 102 has been clicked on a screen 401 (corresponding to the screen shown in FIG. 17(c)) wherein route setting has been completed, a screen 402 is displayed for setting the degree of the route constraint for the section 102. On the screen 402, slide bars ((403a, 403b), (404a, 404b)) for use in setting the degree of a constraint to the position of the ship are displayed beside way points $WP_i$, $WP_{i+1}$, respectively, on the starting point side and terminal point side of the section 102. Rotating bars ((405, 406), (407a, 407b), (408a, 408b)) for use in setting the degree of a constraint to the heading angle of the ship are displayed on the way points $WP_i$, $WP_{i+1}$, respectively, on the starting point side and terminal point side of the section 102. Further, a slide bar 411 used for setting a speed limit (the maximum speed value) for the ship is displayed at an appropriate position on the screen. After the slide bars 403a, 403b for the starting point side and the terminal point side have been positioned at their respective desired positions, a straight line 403c connecting the positions of the slide bars 403a and 403b is displayed. The positions of the slide bars 403a, 403b and the straight line 403c indicate the positions at each of which the weight starts to increase in relation to a deviation from the route 101 to port (a deviation in the y-direction). In this way, the degree of the constraint to the position of the ship with respect to the port side of the ship, i.e., the y direction is set. After the slide bars 404a, 404b for the starting point side and the terminal point side have been positioned at their respective desired positions, a straight line 404c connecting the positions of the slide bars 404a, 404b is displayed. The positions of the slide bars 404a, 404b and the straight line 404c indicate the positions at each of which the weight starts to increase in relation to a deviation from the route 101 to starboard (a deviation in the y-direction). In this way, the degree of the constraint to the position of the ship with respect to the starboard side of the ship, i.e., the y direction is set.

The rotation angles of the rotating bars 405, 406 on the starting point side and the terminal point side indicate target heading angle values at the way points on the starting point side and on the terminal point side, respectively. By positioning the rotating bars 405, 406 at their respective desired rotation angles, target heading angle values at the way points on the starting point side and on the terminal point side can be set. The rotation angles of the rotating bar 407a on the starting point side and the rotating bar 407b on the terminal point side indicate the heading angles at each of which the weight for the port deviation of the heading angle from the target angle at the way point on the starting point side (the terminal point side) increases. Accordingly, by positioning the rotating bars 407a, 407b at their respective desired rotation angles, the degrees of the constraint to the port deviation of the heading angle of the ship at the way points on the starting point side and on the terminal point side are set. The rotation angles of the rotating bar 408a on the starting point side and the rotating bar 408b on the terminal point side indicate the heading angles at each of which the weight for the starboard deviation of the heading angle from the target angle at the way point on the starting point side (the terminal point side) increases. Accordingly, by positioning the rotating bars 408a, 408b at their respective desired rotation angles, the degrees of the constraint to the starboard deviation of the heading angle of the ship at the way points on the starting point side and on the terminal point side are set. Although not shown in the present embodiment, the degree of the constraint to the heading angle of the ship can be set so as to change as described later by a specified operation, when the ship is sailing from the starting point side to the terminal point side in an arbitrary section.

The position of the slide bar 411 indicates the speed at which the weight for the speed of the ship starts to increase. Therefore, the maximum value of the speed of the ship can be set by positioning the slide bar 411 at a desired position.

Data on the degrees of various constraints thus set is transferred to and stored in the control unit 3 (See FIG. 1). The aforesaid bars 403 to 409 and 411 are operated, for example, by a mouse.

Figure 19A:
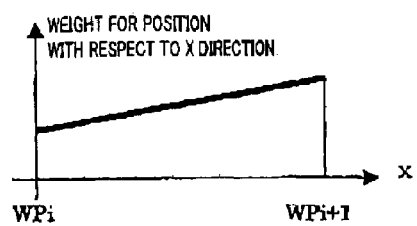
Figure 19B:
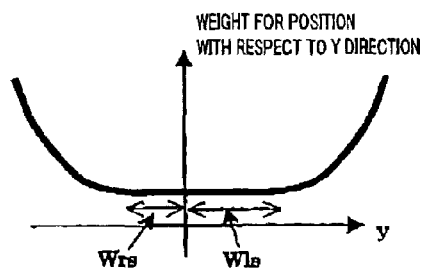
Figure 19C:
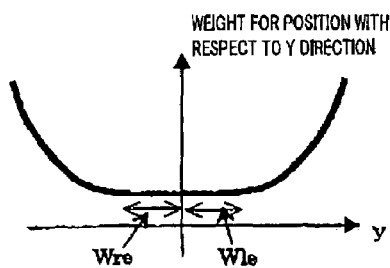
Figure 19D:
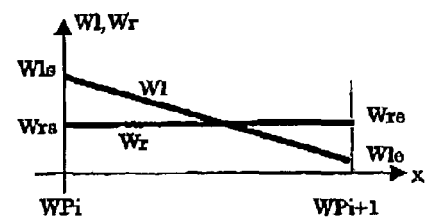
Figure 19E:
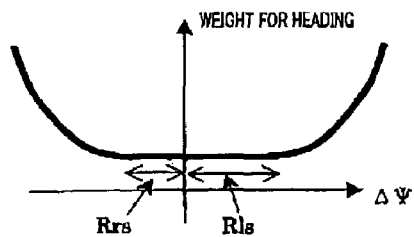
Figure 19F:
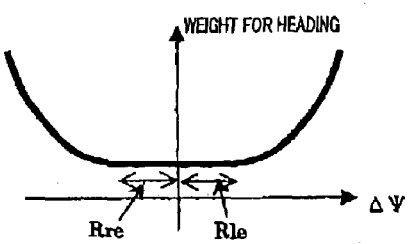
Figure 19G:
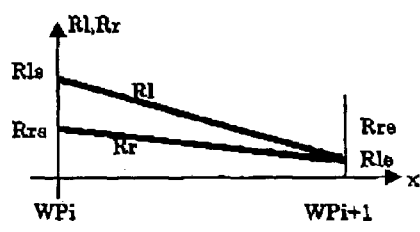

FIGS. 19(a) to 19(g) are diagrammatical views showing examples of setting of weights for a position and for an heading angle, wherein FIGS. 19(a) to 19(c) show examples of setting of a weight for a position, FIG. 19(d) shows an example of setting of the lengths of constant weight zones as functions of a distance to a way point serving as the destination point, and FIGS. 19(e) to 19(g) show examples of setting of a weight for an heading angle.

In the present embodiment, weights for the position with respective to the y direction on the above-described starting point side and terminal point side are set as shown in FIGS. 19(b), 19(c). The lengths Wrs, Wls, Wre, Wle of the constant weight zones on the starting point side and terminal point side correspond to the positions of the slide bars 404a, 403a, 404b, 403b, respectively, shown in FIG. 18. The lengths Wr, Wl of the constant weight zones on the starboard side and the port side are set so as to vary relative to the distance (i.e., the position with respect to the x direction) to the way point $WP_{i+1}$ serving as the destination point as shown in FIG. 19(d). The straight lines, which are indicative of changes in the lengths Wr, Wl of the constant weight zones on the starboard side and the port side relative to the position with respect to the x direction, correspond to the straight lines 404c, 403c shown in FIG. 18. In this embodiment, a weight for the position with respect to the x direction can be set as shown in FIG. 19(a). The weight for the position with respect to the x direction may be a constant value. Where the weight is varied, it is set, for example, as a function of the degree of the constraint to the position with respect to the y direction on the starboard side or port side.

In the present embodiment, weights for heading angles on the starting point side and terminal point side are set as shown in FIGS. 19(*e*) and 19(*f*) respectively. The lengths Rrs, Rls, Rre, Rle of the weight constant zones on the starting point side and terminal point side correspond to the difference between the heading angles of the rotating bars 408*a*, 407*a*, 408*b*, 407*b* and their respective target values The lengths Rr, Rl of the constant weight zones where the weight is constant when the ship turns to starboard or port are set to vary relative to the distance (i.e., the position with respect to the x direction) to the way point $WP_{i+1}$ serving as the destination point, as shown in FIG. 19(*g*).

Figure 20:
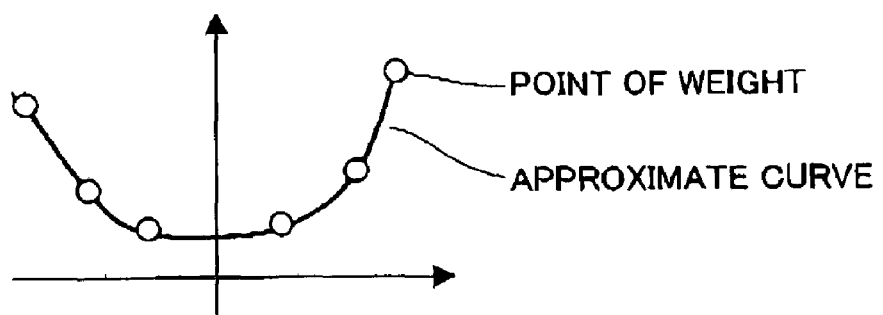
FIG. 20 shows a method of drawing a curve indicative of changes in a weight for a desired state variables.

FIG. 20 shows a method of drawing a curve indicative of changes in a weight for an arbitrary state variables. As shown in FIG. 20, this curve is prepared in such a way that a plurality of points each of which indicates a weight value are first plotted and then, these points are connected with an approximate curve.

FIGS. 21(*a*) to 21(*p*) show examples of the curve prepared through such a process, each of which is indicative of changes in a weight relative to a state variables.

Third Embodiment

In a third embodiment of the invention, the route 101 shown in FIG. 4 associated with the first embodiment has only two way points, that is, a starting point and a terminal point, and these two way points are set to the same point. With this arrangement, the ship 5 is controlled so as to be kept at a fixed point. In addition, this control can be performed with the same algorithm (procedure) as in the case where the ship sails along the route 101, so that the control unit can be simplified, Fourth Embodiment In a fourth embodiment of the invention, the guide point GP of the first embodiment shown in FIG. 4 is set as the destination point. In this case, the local coordinate system and the degree of the route constraint are updated in real time. This arrangement obviates the need for setting way points.

Fifth Embodiment

Figure 22A:
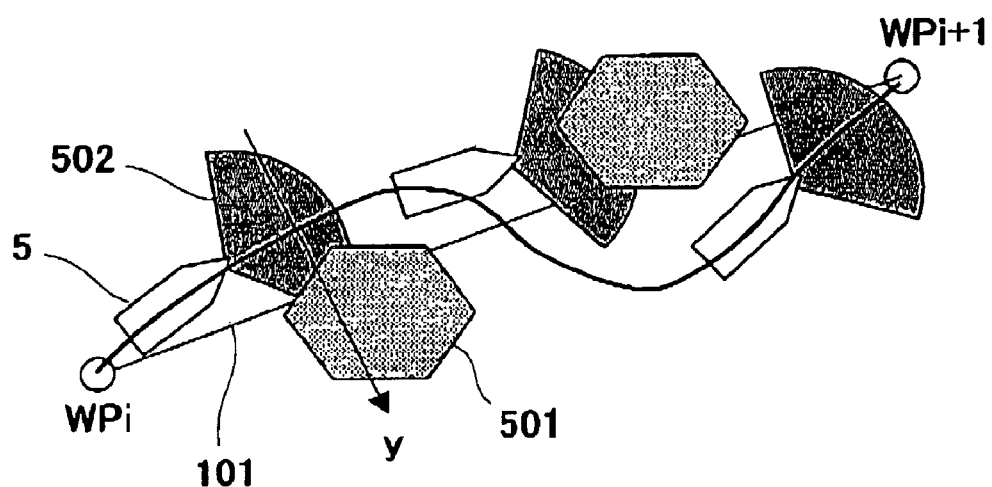
Figure 22B:
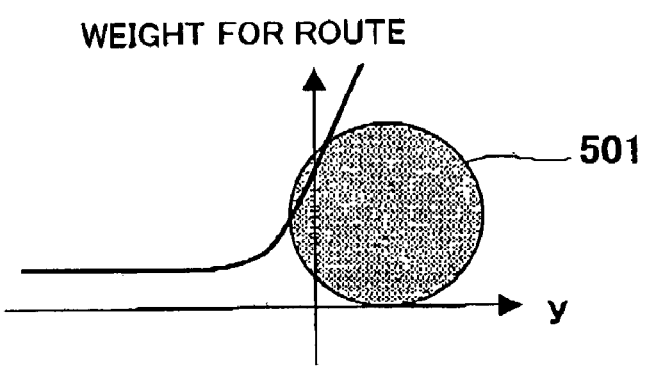

FIGS. 22(*a*),22(*b*) are views showing the operation and structure of a ship maneuver system according to a fifth embodiment of the invention, wherein FIG. 22(*a*) shows an action for avoiding an obstacle, whereas FIG. 22(*b*) shows changes in a weight for a position with respect to the y direction.

In the present embodiment, the ship maneuver system 1 (see FIG. 1) includes an obstacle detector 1. The obstacle detector is composed of a radar, an ultrasonic sonar or the like. In FIG. 22(*a*), reference numeral 502 designates an obstacle detectable range for the obstacle detector. If the obstacle detector detects an obstacle 501 near the ship 5, the control unit 3 (see FIG. 1) sets a weight for the position with respect to the y direction such that it increases, as shown in FIG. 22(*b*), short of the region where the obstacle 501 exists. Specifically, the weight for the position with respect to the y direction is updated in real time based On data on an obstacle. With this arrangement, the ship 5 moves so as to avoid the obstacle 501 as shown in FIG. 22(*a*). As a result, the ship 5 automatically avoids the obstacle 501 near the route 101 and sails safely.

Six Embodiment

In a sixth embodiment of the invention, the weights of the performance index are set as a function of time. For example, if the weight for the speed of the ship is set to change after an elapse of a certain time, the ship will change its speed after an elapse of the certain time. Accordingly, the ship can be automatically stopped or started by properly setting the weight.

Seventh Embodiment

According to a seventh embodiment of the invention, if an event is detected, the speed of the ship will be changed.

In a first arrangement, the weights of the performance index are set as a function of an event signal. For instance, in FIG. 2 associated with the first embodiment, the control unit 3 is designed such that if an operation button has been pressed, the sensor detects it to issue a specified signal (event signal). After the specified signal has been input to the route optimizing operation unit 8, the weight for the speed of the ship is set to vary. With this arrangement, the speed of the ship is changed by pressing the operation button so that the ship can be started or stopped.

In a second arrangement, if the event signal has been input to the route optimizing operation unit 8, the destination point is switched between other points (e g., the present destination point (the next way point WP)) than the present location and the present location. With this arrangement, if the operation button is pressed while the ship is sailing, the ship will stop and if the operation button is pressed while the ship is stopped, the ship will start to move.

Strictly speaking, if the destination point is switched to the present location in this case, the ship goes past the destination point after switching owing to the dynamic characteristics of the ship so that control is performed so as to make the ship return. As a result, the timing of stopping delays to that extent, It is therefore preferable to take the following measure: the position at which the ship will stop if a specified thrust is exerted, at the present time, in a direction opposite to the heading direction of the ship is predicted, taking account of the dynamic characteristics of the ship and the destination point is switched to the predicted position. With this arrangement, the ship can be brought to a stop in a shorter time. In this case, the ship can be started by switching the destination point to any of points other than the above predicted point.

Eighth Embodiment

An eighth embodiment of the invention is associated with maneuver of movable objects other than ships. As apparent from the equations (1) to (12) of the first embodiment, the optimizing control with the performance index of the equation (3) is applicable not only to ships but also to other general movable objects. The equations (3) to (12) can be applied without change, especially to cases where a movable object moves within a two-dimensional space under the force or moment of resistance, friction and the like. In cases where a movable object moves within a three-dimensional space under fluid resistance, state variables and thrusts (manipulated variables) associated with the position with respect to the z direction, heading angle in the x-z plane and heading angle in the y-z plane are added to the performance index of the equation (3), and a term relating to the z axis is added to the dynamic equations (4) to (9), whereby these equations can be applied to the control of a movable object moving in a three-dimensional space.

With this arrangement, even if disturbances affect the movable object, it can be automatically steered so as to move along a route while minimizing power in compliance with given conditions.

EXAMPLE 8

Example 8 is associated with an application of the present invention to maneuver of an aircraft.

Figure 23:
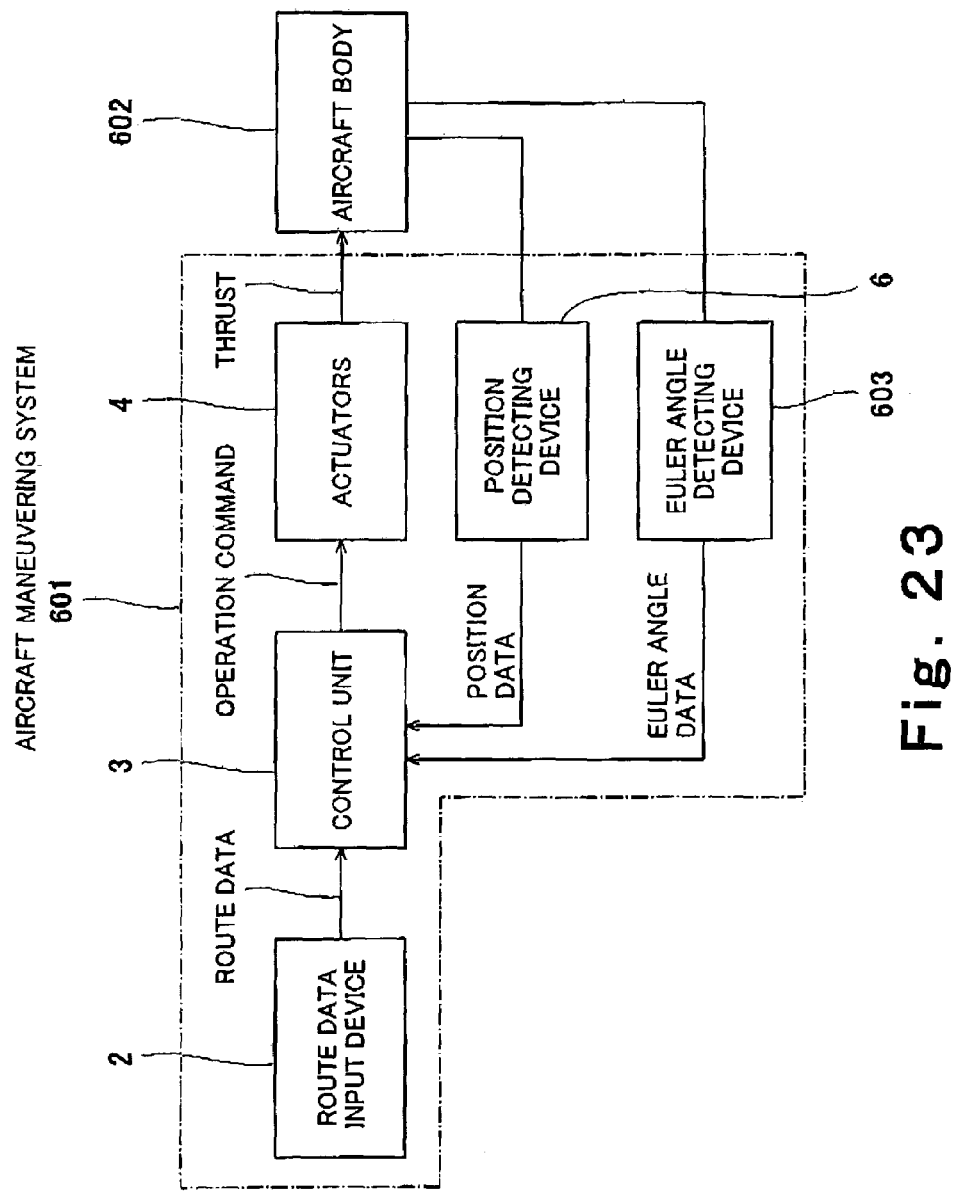
FIG. 23 is a block diagram showing a structure of the control system of an aircraft maneuver system according to Example 8.
Figure 24:
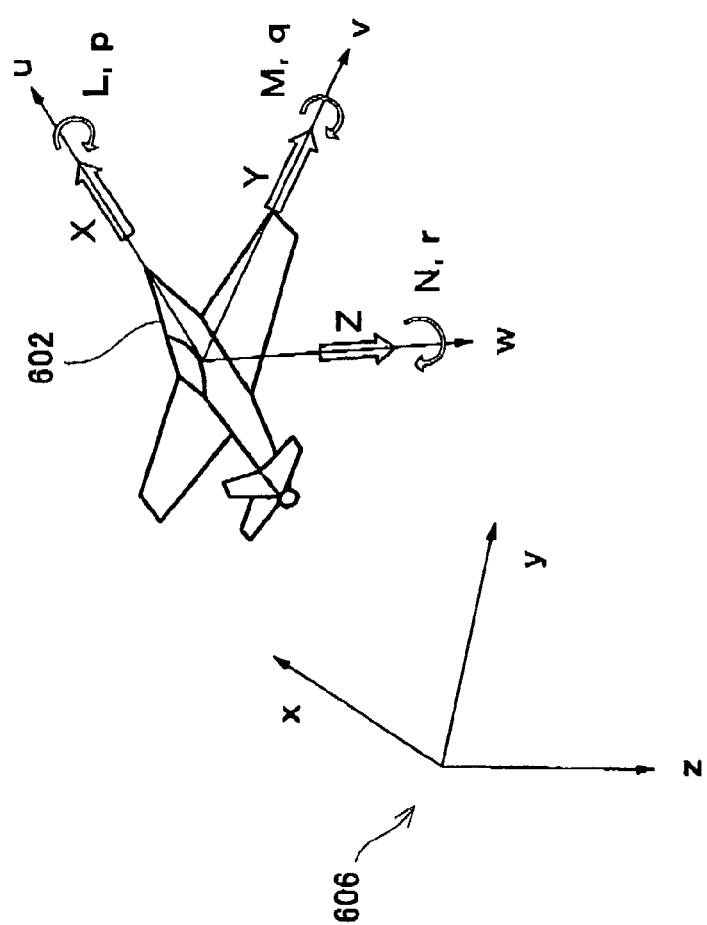
FIG. 24 shows an aircraft model and the definitions of state variables according to Example 8.

FIG. 23 is a block diagram showing a structure of the control system of an aircraft maneuver system according to the present example. FIG. 24 shows an aircraft model and the definitions of state variables according to the present example. It should be noted that the reference numerals common to FIGS. 1 and 23 represent the same or equivalent parts.

As shown in FIG. 23, an object to be controlled by an aircraft maneuver system 601 of the present example is an aircraft 602, and the aircraft maneuver system 601 has an Euler angle detecting device 603 in place of the heading angle detecting device 7 provided for the ship maneuver system 1 shown in FIG. 1. Except the above points, the aircraft maneuver system 601 is similar to the ship maneuver system 1. The Euler angle detecting device 603 is composed of, for example, a directional gyro and measures the Euler angles of the aircraft to output as Euler angle data.

As shown in FIG. 24, the following eighteen state variables are defined in the aircraft model employed in the aircraft body control of the present example.

(x, y, z): the position of the gravity point of the aircraft body in the global fixed coordinate system (u, v, w): the body fixed coordinate axis components of the speed vector of the aircraft body (p, q, r): the body fixed axis components of the angular speed of the aircraft body ($\Theta, \Phi, \Psi$): Euler angles (the angles that define the orientation of the body axis with respect to the ground fixed coordinate system)

(X, Y, Z): thrusts for translational motion (L, M, N): thrust moments for rotating motion In contrast with the state variables of the first embodiment (FIG. 5), the state variables of Example 8 include state variables with respect to the z-axis and Euler angles ($\Theta, \Phi, \Psi$).

The dynamic equation of the aircraft model is as follows.

$$\dot{u} = -qw + rv - g\sin\Theta + X_a + X \quad (13)$$

$$\dot{v} = -ru + pw + g\cos\Theta\sin\Phi + Y_a + Y \quad (14)$$

$$\dot{w} = -pv + qu + g\cos\Theta\cos\Phi + Z_a + Z \quad (15)$$

$$I_{xx}\dot{p} - I_{xz}\dot{r} = -(I_{zz} - I_{yy})qr + I_{xz}pq + L_a + L \quad (16)$$

$$I_{yy}\dot{q} = -(I_{xx} - I_{zz})rp - I_{xz}(p^2 - r^2) + M_n + M \quad (17)$$

$$-I_{xz}\dot{p} + I_{zz}\dot{r} = -(I_{yy} - I_{xx})pq - I_{xz}qr + N_u + N \quad (18)$$

$$\dot{\Phi} = p + q\sin\Phi\tan\Theta + r\cos\Phi\tan\Theta \quad (19)$$

$$\dot{\Theta} = q\cos\Phi - r\sin\Phi \quad (20)$$

$$\dot{\Psi} = q\sin\Phi\sec\Theta + r\cos\Phi\sec\Theta \quad (21)$$

$$\dot{x} = u\cos\Phi\cos\Psi + v(\sin\Phi\sin\Theta\cos\Psi - \cos\Phi\sin\Psi) + w(\cos\Phi\sin\Theta\cos\Psi + \sin\Phi\sin\Psi) \quad (22)$$

$$\dot{y} = u\cos\Phi\sin\Psi + v(\sin\Phi\sin\Theta\sin\Psi + \cos\Phi\cos\Psi) + w(\cos\Phi\sin\Theta\sin\Psi - \sin\Phi\cos\Psi) \quad (23)$$

$$\dot{z} = -u\sin\Theta + v\sin\Phi\cos\Theta + w\cos\Phi\cos\Theta \quad (24)$$

$$X = \frac{Kx}{Tx \cdot s + 1} Xr \quad (25)$$

$$Y = \frac{Ky}{Ty \cdot s + 1} Yr \quad (26)$$

$$Z = \frac{Kz}{Tz \cdot s + 1} Zr \quad (27)$$

$$L = \frac{Kl}{Tl + 1} Lr \quad (28)$$

$$M = \frac{Km}{Tm \cdot s + 1} Mr \quad (29)$$

$$N = \frac{Kn}{Tn \cdot s + 1} Nr \quad (30)$$

where $X_a, Y_a, Z_a, L_a, M_a$ and $N_a$ are aerodynamic forces and aerodynamic force moments which are dependent on the state variables u, v, w, p, q, r, $\Theta$ and $\Theta$, $X_r, Y_r, Z_r, L_r, M_r$ and $N_r$ are inputs.

The performance index for the non-linear optimizing control of the present example is set as represented by Equation (31).

$$J = \frac{1}{2}\left[\sum_{i=1}^{18} S_{fi}(x_{refi} - x_i)^2\right]_{t+T} + \frac{1}{2}\int_{t}^{t+T}\left\{\sum_{i=1}^{18} q_i(x_{refi} - x_i)^2 + \sum_{i=1}^{6} r_i u_i\right\} dt \quad (31)$$

where $X_{ref}$ is a target state, that is, the position and state of the aircraft body at a way point WP serving as the destination point.

Figure 25:
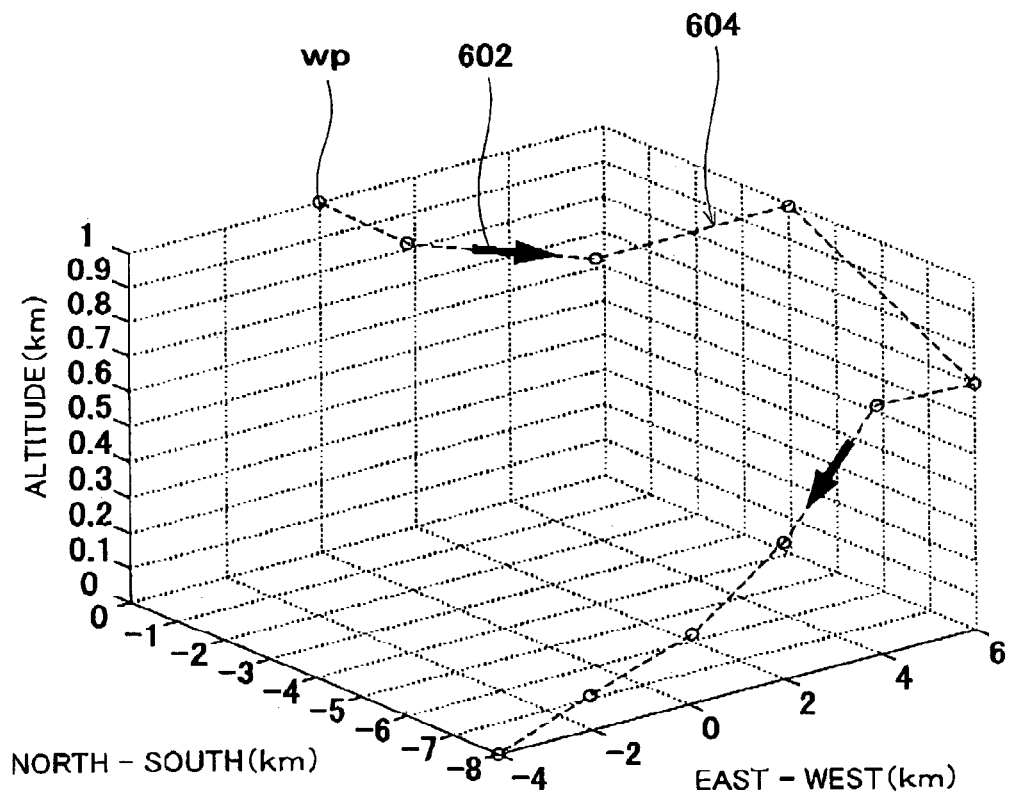
FIG. 25 diagrammatically shows an example of setting of an aircraft flight course in aircraft body control according to Example 8.

FIG. 25 diagrammatically shows an example of setting of an aircraft flight course in the aircraft body control of Example 8.

As shown in FIG. 25, one or more way points WP are set in a three-dimensional space (space above the ground) represented by three-dimensional coordinates composed of an east-west axis, south-north axis and altitude axis which intersect with one another at right angles. The way points thus set are connected with straight lines, thereby determining a flight course 604, Herein, a guidance route for aircraft landing is shown.

Figure 26:
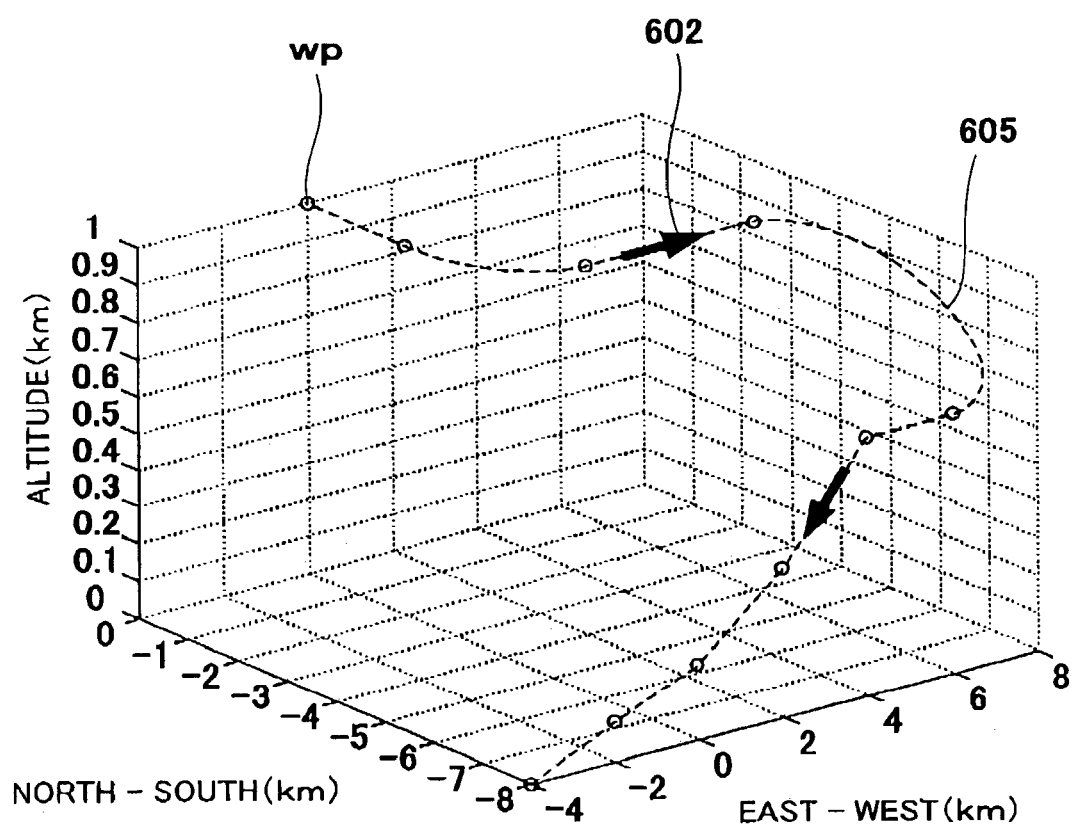
FIG. 26 shows a simulation result of the aircraft body control of Example 8.

FIG. 26 shows a simulation result of the aircraft body control of Example 8. There is shown, herein, a result of a simulation where the aircraft takes the guidance route 604 shown in FIG. 25. As seen from FIG. 26, the aircraft 602 can be automatically steered so as to take the optimal route 605, by the aircraft body control of the present example.

EXAMPLE 9

Example 9 is associated with an application of the present invention to maneuver of an underwater craft.

FIG. 27 is a table showing the definitions of the state variables of an underwater craft according to the present example. The following equation represents the relationship between the Euler angle expression and directional cosine matrix expression of the attitude angle of the ship, regarding the state variables [C] shown in FIG. 27.

$$[C] \equiv \begin{bmatrix} l_1 & m_1 & n_1 \\ l_2 & m_2 & n_2 \\ l_3 & m_3 & n_3 \end{bmatrix}$$

$$= \begin{bmatrix} \cos\theta\cos\phi & \cos\theta\sin\phi & -\sin\theta \\ \sin\psi\sin\theta\cos\phi - \cos\psi\sin\phi & \sin\psi\sin\theta\sin\phi + \cos\psi\cos\phi & \sin\psi\cos\theta \\ \cos\psi\sin\theta\cos\phi + \sin\psi\sin\phi & \cos\psi\sin\theta\sin\phi - \sin\psi\cos\phi & \cos\psi\cos\theta \end{bmatrix}$$

It should be noted that the underwater craft serving as the controlled object of the present example is a submarine.

The dynamic equation for this underwater craft model is as follows.

$$([M] + [M^{ADD}])\begin{Bmatrix} [\dot{u}] \\ [\dot{\omega}] \end{Bmatrix} = -\begin{bmatrix} [\omega x] & 0 \\ [uy] & [\omega x] \end{bmatrix}[M]\begin{Bmatrix} [u] \\ [\omega] \end{Bmatrix} - \begin{bmatrix} [\omega x] & 0 \\ [u,x] & [\omega x] \end{bmatrix}[M^{ADD}]\begin{Bmatrix} [u_r] \\ [\omega] \end{Bmatrix} +$$

$$\begin{bmatrix} [\omega x] & 0 \\ 0 & [\omega x] \end{bmatrix}[\tilde{M}]\begin{Bmatrix} [u_r] \\ O \end{Bmatrix}$$

$$[F_{HD}] + [F_{BG}] + [F_{WA}] + [F_{TH}] + [F_P] +$$

こごに

$$[ux] = \begin{bmatrix} 0 & -w & v \\ w & 0 & -u \\ -v & u & 0 \end{bmatrix} \quad [u_r x] = \begin{bmatrix} 0 & -w_r & v_r \\ w_r & 0 & -u_r \\ -v_r & u_r & 0 \end{bmatrix}$$

$$[\omega x] = \begin{bmatrix} 0 & -r & q \\ r & 0 & -p \\ -q & p & 0 \end{bmatrix}$$

$$[M] = \begin{bmatrix} m & 0 & 0 & 0 & mZ_G & -my_G \\ & m & 0 & -mZ_G & 0 & mx_G \\ & & m & my_G & -mx_G & 0 \\ & sym, & & I_{xx} & -I_{xy} & -I_{xz} \\ & & & & I_{yy} & -I_{yz} \\ & & & & & I_{zz} \end{bmatrix}$$

The state variables of Example 9 differ in code from, but are substantially the same as those of Example 8. Specifically, $[F_{WA}]$, $[F_{TH}]$, $[F_P]$ correspond to X, Y, Z, L, M and N of Example 8.

The performance index for the non-linear optimizing control of the present example is determined, similarly to Example 8.

Next, a simulation result of the ship control of the present example will be explained in comparison with the ship control according to the conventional PID control law.

Figure 28A:
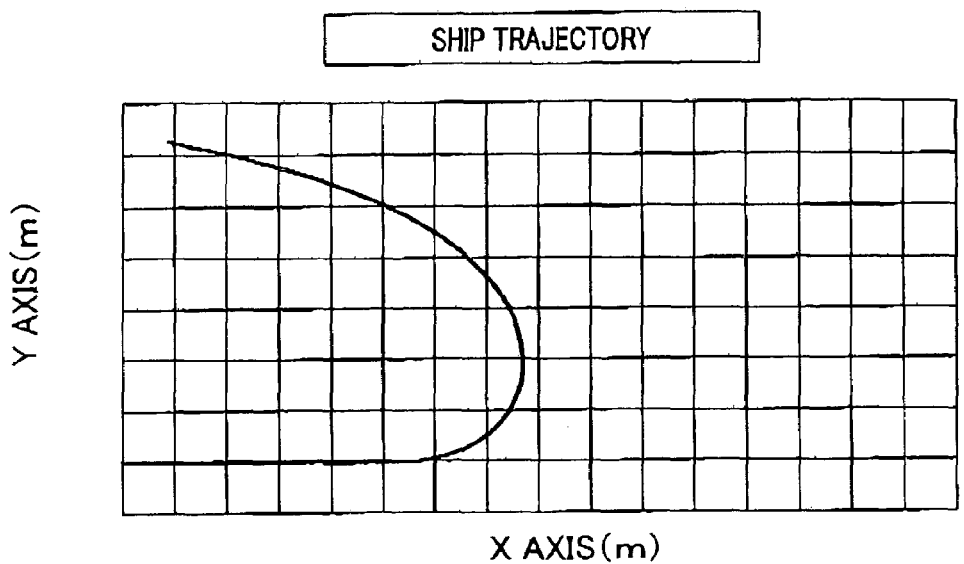
Figure 28B:
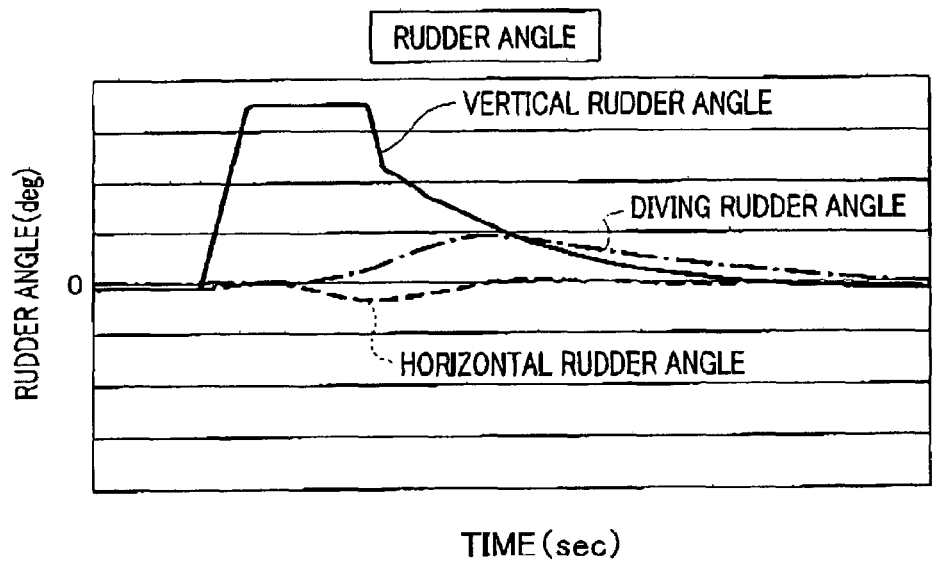
Figure 29A:
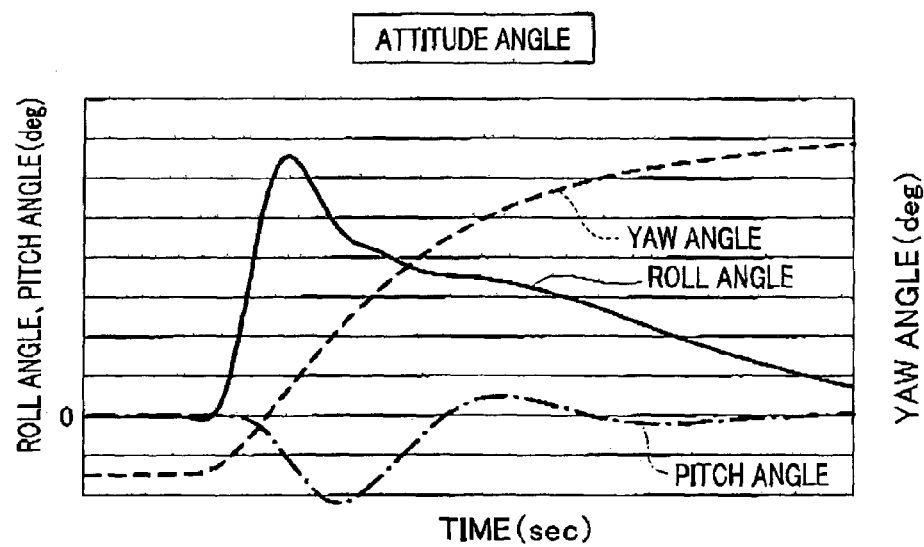
Figure 29B:
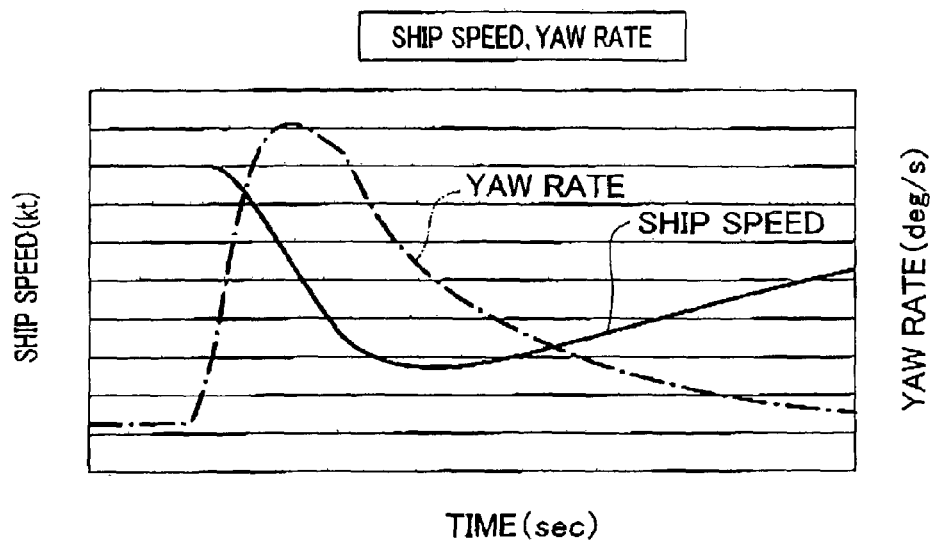

FIGS. 28(a), 28(b), 29(a) and 29(b) are views each showing a simulation result of the ship control according to the conventional PID control law. FIG. 28(a) shows a ship trajectory and FIG. 28(b) shows variations in horizontal rudder angle, vertical rudder angle, and diving rudder angle (they are hereinafter referred to as "rudder angles"). FIG. 29(a) shows variations in roll angle, pitch angle and yaw angle (they are hereinafter referred to as "attitude angles"). FIG. 29(b) shows variations in ship speed and yaw rate.

Figure 30A:
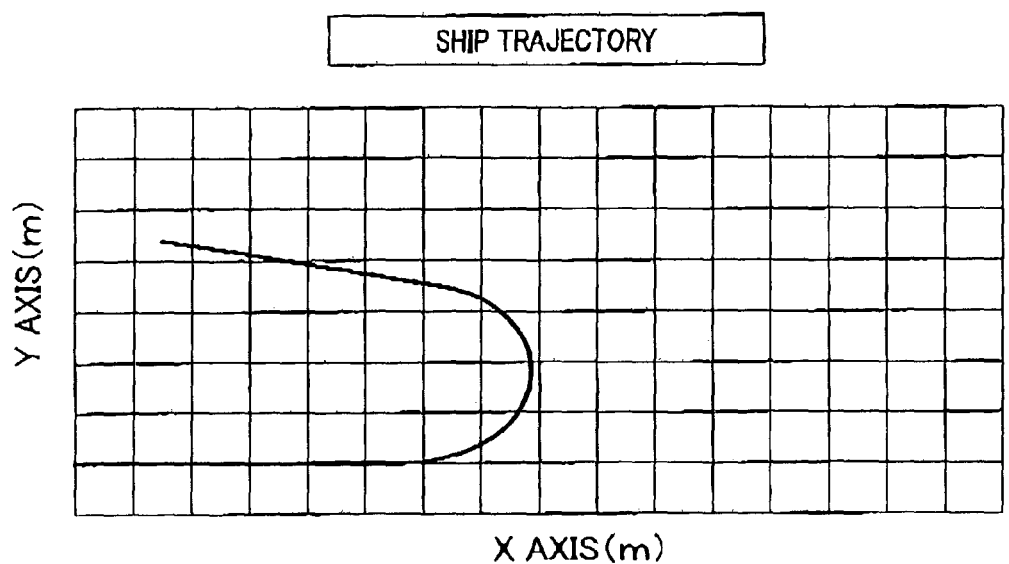
Figure 30B:
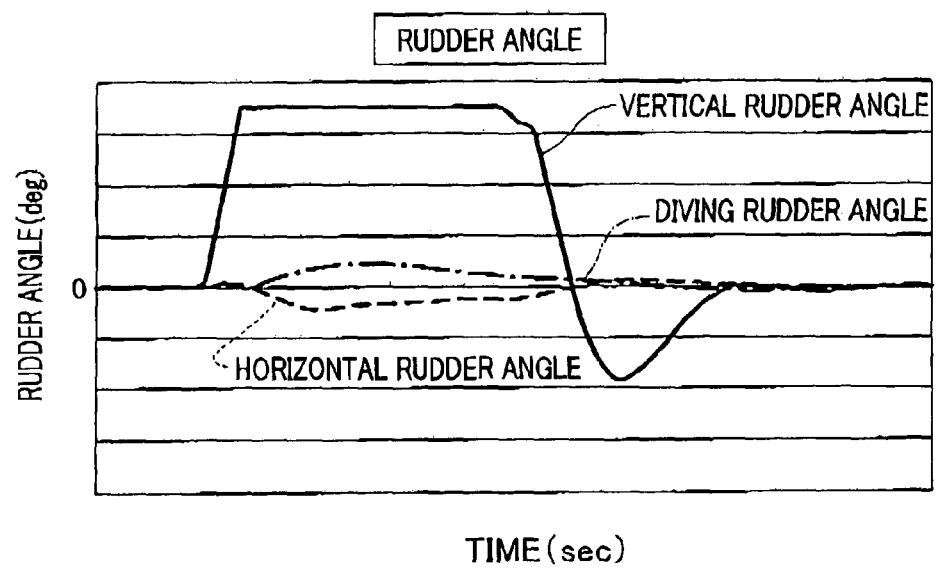
Figure 31A:
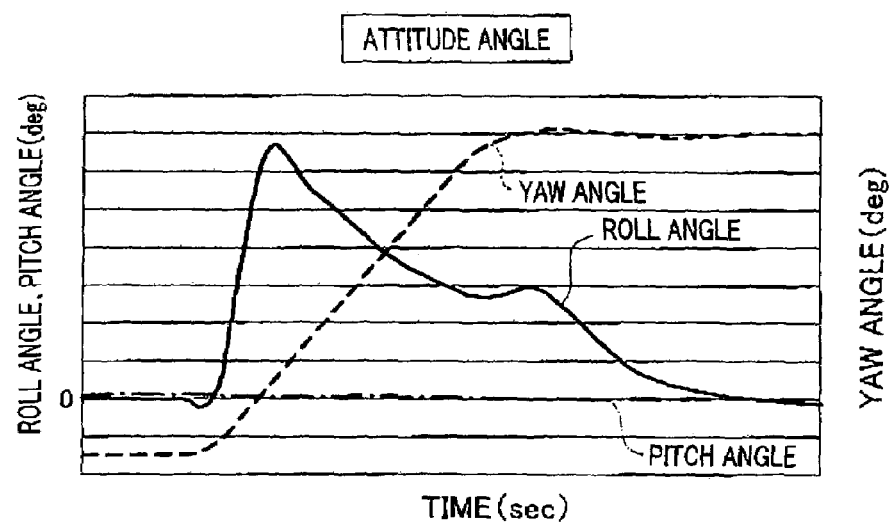
Figure 31B:
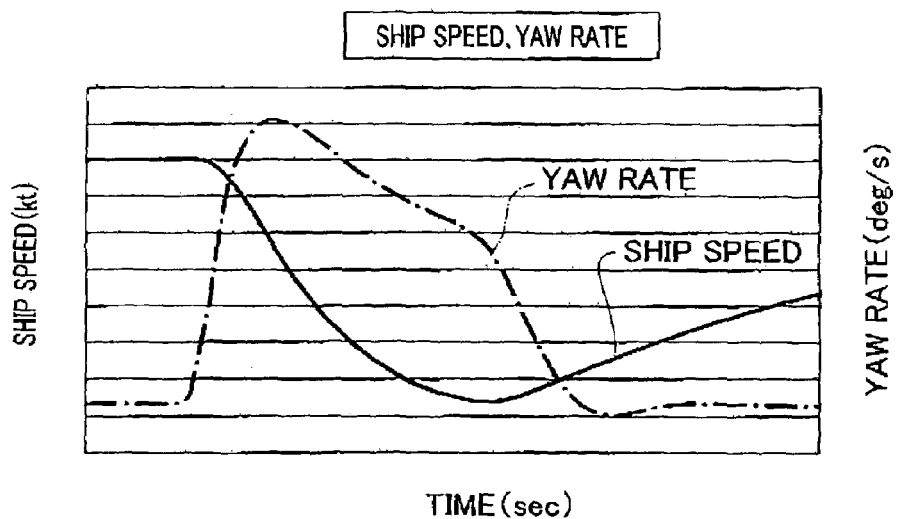

FIGS. 30(a), 30(b), 31(a) and 31(b) are views each showing a simulation result of the ship control according to Example 9. FIG. 30(a) shows a ship trajectory and FIG. 30(b) shows variations in rudder angles. FIG. 31(a) shows variations in attitude angles and FIG. 31(b) shows variations in ship speed and yaw rate.

According to these simulation results, the ship control based on the conventional PID control law is unable to make the ship turn rapidly as apparent from FIG. 28(a), whereas the ship control according to the present example enables a rapid turn of the ship as apparent from FIG. 30(a).

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A method of maneuvering a movable object, comprising:
   setting a planned route of the movable object and a destination point on the planned route;
   calculating a thrust value in real time which minimizes or maximizes a performance index, over a specified period of time from a present time to a future time, associated with one or more state variables and thrust required for the movable object to reach the destination point;
   controlling the movable object to cause the movable object to output the thrust of the calculated thrust value to move the movable object; and
   setting constraint of the movable object on the planned route by setting weights for the state variables and the thrust, wherein
   the performance index is a function of variables including the weighted state variables and the weighted thrust; and wherein one or more transit points are set on the planned route, and the control is performed by sequentially setting the one or more set transit points as the destination point.

2. The method according to claim 1, wherein a guide point is set which consists of a virtual point and moves on the planned route, preceding the movable object, and wherein when the guide point has reached a transit point which is the present destination point, the destination point is switched to the next transit point.

3. The method according to claim 1, wherein the weights are set for each zone of the planned route, each zone being defined by the transit points.

4. A method of maneuvering a movable object, comprising:
   setting a planned route of the movable object and a destination point on the planned route;
   calculating a thrust value in real time which minimizes or maximizes a performance index, over a specified period of time from a present time to a future time, associated with one or more state variables and thrust required for the movable object to reach the destination point;
   controlling the movable object to cause the movable object to output the thrust of the calculated thrust value to move the movable object; and
   setting constraint of the movable object on the planned route by setting weights for the state variables and the thrust, wherein
   the performance index is a function of variables including the weighted state variables and the weighted thrust; and
   wherein the weights are set as function of positions.

5. A system for maneuvering a movable object, comprising:
   means for setting a planned route of the movable object and a destination point on the planned route;
   arithmetic operation means for calculating a thrust value in real time which minimizes or maximizes a performance index, over a specified period of time from a present time to a future time, associated with one or more state variables and thrust required for the movable object to reach the destination point;
   a control means for controlling an actuator to cause the actuator to output the thrust of the calculated thrust value to move the movable object; and
   means for setting constraint of the movable object on the planned route by setting weights for the state variables and the thrust, wherein
   the performance index is a function of variables including the weighted state variables and the weighted thrust; and
   further comprising:
   means for setting one or more transit points on the planned route, wherein the control means perform the control by sequentially setting one or more set transit points as the destination point.

6. The system according to claim 5, further comprising means for setting a guide point which consists of a virtual point and moves on the planned route, preceding the movable object,
   wherein when the guide point has reached a transit point which is the present destination point, the destination point is switched to the next transit point.

7. The system according to claim 5, wherein the means for setting the weights sets
   the weights for each zone of the planned route, each zone being defined by the transit points.

8. A system for maneuvering a movable object, comprising:
   means for setting a planned route of the movable object and a destination point on the planned route;
   arithmetic operation means for calculating a thrust value in real time which minimizes or maximizes a performance index, over a specified period of time from a present time to a future time, associated with one or more state variables and thrust required for the movable object to reach the destination point;
   a control means for controlling an actuator to cause the actuator to output the thrust of the calculated thrust value to move the movable object; and
   means for setting constraint of the movable object on the planned route by setting weights for the state variables and the thrust, wherein
   the performance index is a function of variables including the weighted state variables and the weighted thrust; and
   wherein the weights are set as function of positions.

9. A system for maneuvering a movable object, comprising:
   means for setting a planned route of the movable object and a destination point on the planned route;
   arithmetic operation means for calculating a thrust value in real time which minimizes or maximizes a performance index, over a specified period of time from a present time to a future time, associated with one or more state variables and thrust required for the movable object to reach the destination point;
   a control means for controlling an actuator to cause the actuator to output the thrust of the calculated thrust value to move the movable object; and
   means for setting constraint of the movable object on the planned route by setting weights for the state variables and the thrust, wherein
   the performance index is a function of variables including the weighted state variables and the weighted thrust; and
   wherein a state of the movable object is estimated, using a non-linear or linear state observer.

* * * * *